(12) United States Patent
Takeuchi et al.

(10) Patent No.: US 8,909,386 B2
(45) Date of Patent: Dec. 9, 2014

(54) VEHICLE CONTROL SYSTEM

(75) Inventors: Keisuke Takeuchi, Susono (JP); Toshio Tanahashi, Susono (JP); Hiroyuki Hanamura, Gotenba (JP); Shin Noumura, Susono (JP); Ken Koibuchi, Hadano (JP); Kaiji Itabashi, Susono (JP); Yoji Takanami, Anjyo (JP); Norimi Asahara, Numadu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 185 days.

(21) Appl. No.: 13/389,102

(22) PCT Filed: Aug. 17, 2010

(86) PCT No.: PCT/IB2010/002025
§ 371 (c)(1),
(2), (4) Date: Feb. 15, 2012

(87) PCT Pub. No.: WO2011/021090
PCT Pub. Date: Feb. 24, 2011

(65) Prior Publication Data
US 2012/0143398 A1   Jun. 7, 2012

(30) Foreign Application Priority Data

Aug. 18, 2009 (JP) .................. 2009-189499
Mar. 12, 2010 (JP) .................. 2010-056594

(51) Int. Cl.
G06F 7/00      (2006.01)
B60W 40/12    (2012.01)
B60W 40/107  (2012.01)

(52) U.S. Cl.
CPC ............. B60W 40/12 (2013.01); B60W 40/107 (2013.01)

USPC .............................................. 701/1; 303/139

(58) Field of Classification Search
USPC ............... 701/1, 82, 70, 72, 73–79; 180/197; 303/163, 139, 188, 167, 198
See application file for complete search history.

(56) References Cited

U.S. PATENT DOCUMENTS

| | | | | |
|---|---|---|---|---|
| 5,717,591 A | * | 2/1998 | Okada et al. | 701/82 |
| 2005/0143893 A1 | * | 6/2005 | Takamatsu et al. | 701/91 |

FOREIGN PATENT DOCUMENTS

| | | |
|---|---|---|
| JP | A-6-249007 | 9/1994 |
| JP | A-09-242863 | 9/1997 |
| JP | A-10-077893 | 3/1998 |
| JP | A-11-2320 | 1/1999 |
| JP | A-11-129924 | 5/1999 |
| JP | A-2000-088872 | 3/2000 |
| JP | A-2001-310724 | 11/2001 |
| JP | A-2004-257434 | 9/2004 |
| JP | A-2004-257435 | 9/2004 |
| JP | A-2006-062505 | 3/2006 |
| JP | A-2007-276667 | 10/2007 |
| JP | A-2009-154586 | 7/2009 |
| JP | A-2009-154759 | 7/2009 |

* cited by examiner

*Primary Examiner* — Marthe Marc-Coleman
(74) *Attorney, Agent, or Firm* — Oliff PLC

(57) ABSTRACT

In a vehicle control system, an index used to set a running characteristic of a vehicle is obtained based on a running condition of the vehicle. A change of the index that makes behavior of the vehicle crisper is more likely to occur than a change of the index that makes the behavior of the vehicle milder. When it is determined that the vehicle is in a turning condition, the change of the index or a change of the miming characteristic based on the index is less likely to occur than when it is determined that the vehicle is not in the turning condition.

17 Claims, 18 Drawing Sheets

VEHICLE CONTROL SYSTEM

BACKGROUND OF THE INVENTION

1. Field of the Invention

The invention relates to a vehicle control system that is configured to control behavior characteristics or acceleration/deceleration characteristics (which will be called "running characteristics") of the vehicle, such as a power characteristic, a steering characteristic and a suspension characteristic of the vehicle, so that the running characteristics match a running environment and driver's preferences and intention regarding running.

2. Description of the Related Art

While the vehicle behavior, such as a vehicle speed and a running direction, varies according to the driver's accelerating/decelerating operation and steering operation, the relationship between the amount of the driver's operation and the amount of change of the behavior is determined not only by the energy efficiency, such as a fuel efficiency, but also by characteristics, such as a ride comfort, quietness and power performance, which are required of the vehicle.

In the meantime, environments in which the vehicle runs include a wide variety of surroundings or road types, such as an urban area, an expressway, a winding road, an uphill, and a downhill, and there are a variety of driver's preferences and intentions regarding running, and there are a variety of impressions the driver receives from the vehicle during running. Therefore, an expected running characteristic is not necessarily obtained if the running environment changes or the vehicle is driven by another driver. As a result, so-called driveability may deteriorate.

Thus, one type of vehicle has been developed which is arranged to manually select running characteristics, such as a power output characteristic (or acceleration characteristic) and a suspension characteristic, concerning the behavior of the vehicle, by operating a mode selection switch. Namely, the vehicle is arranged to select a drive mode from, for example, a sporty mode in which the vehicle runs with an excellent accelerating ability, and the suspension is set to be somewhat hard, a normal mode in which the vehicle accelerates at a relatively low rate, and has a relatively soft suspension characteristic, and an eco mode in which the fuel economy or efficiency is prioritized by operating the switch.

Also, various systems have been proposed which are configured to cause the driving orientation to be reflected by behavior control of the vehicle. This type of system does not necessitate any switching operation, and permits changes of subtle or detailed characteristics. One example of this type of system is described in Japanese Patent Application Publication No. 06-249007 (JP-A-06-249007). In the system described in JP-A-06-249007, which is a driving force control system using a neurocomputer, the relationship of the acceleration with respect to the acceleration stroke and the vehicle speed is learned as a required acceleration model, and the throttle opening is calculated based on a deviation between the model and a second reference acceleration model that reflects the driver's orientation or preferences in connection with running, and a deviation between the second reference acceleration model and a first reference acceleration model as a standard model.

Also, a system that is configured to detect the driving characteristics or driving orientation while distinguishing those of the longitudinal direction of the vehicle from those of the lateral direction is described in Japanese Patent Application Publication No. 11-129924 (JP-A-11-129924). Further, Japanese Patent Application Publication No. 11-2320 (JP-A-11-2320) describes a system that is configured to engage a lock-up clutch, and prohibit shifting when it is detected that a vehicle is in a turning condition.

According to each of systems described in JP-A-06-249007, JP-A-2004-257434 and JP-A-11-2320, improvement needs to, be made to cause the request or driving orientation of the driver to be accurately reflected by the running characteristics.

SUMMARY OF THE INVENTION

The invention provides a vehicle control system that causes driver's preferences and intention regarding running or running conditions of the vehicle to be accurately reflected by running characteristics, such as the behavior of the vehicle or the acceleration.

A first aspect of the invention relates to a vehicle control system in which an index used to set a running characteristic of a vehicle is obtained based on a running condition of the vehicle, and a change of the index that makes behavior of the vehicle crisper is more likely to occur than a change of the index that makes the behavior of the vehicle milder. In the vehicle control system, when it is determined that the vehicle is in a turning condition, the index or the running characteristic based on the index is less likely to be changed than when it is determined that the vehicle is not in the turning condition.

In the vehicle control system according to the first aspect, when it is determined that the vehicle is in the turning condition, the index or the running characteristic based on the index may be kept.

In the vehicle control system according to the first aspect, the index may be set to a large value when the running characteristic for making the behavior of the vehicle crisp is provided, and the index may be set to a small value when the running characteristic for making the behavior of the vehicle mild is provided; if a current value of the index obtained based on the current running condition of the vehicle is larger than a held value of the index that has already been set and has been held, the index may be updated to the current value; and if the current value of the index is equal to or smaller than the held value of the index, an integral value of a deviation between the current value and the held value may be calculated, and when the integral value exceeds a predetermined threshold value, the value of the index may be reduced.

In the vehicle control system according to the first aspect, when the vehicle is running with crispness, the index is set to provide the running characteristic for enabling the vehicle to run with crispness. When the vehicle is running with less crispness, the index is set to provide the running characteristic for enabling the vehicle to run with less crispness. Also, the change of the index that increases the degree of crispness of the behavior is more likely to occur than the change of the index that reduces the degree of crispness of the behavior. When the index is changed in this manner, it is determined whether the vehicle is in the turning condition. If it is determined that the vehicle is in the turning condition, the index or the running characteristic based on the index is less likely to be changed. In contrast, if it is determined that the vehicle is not in the turning condition, the index or the running characteristic based on the index is more likely to be changed. As a result, when the vehicle is in the turning condition, even if the lateral acceleration is increased due to turning, and therefore, a situation that may increase the value of the index occurs, or even if the other condition (i.e., an index reduction condition) is satisfied, and therefore, a situation that may reduce the degree of crispness occurs, the previous value of the index is kept. Accordingly, even if the accelerating or decelerating operation is performed to turn the vehicle, it is possible to suppress a change of the index or a change of the running characteristic.

In the vehicle control system according to the first aspect, the index may be set to a large value when the running characteristic for making the behavior of the vehicle crisp is provided, and the index may be set to a small value when the running characteristic for making the behavior of the vehicle mild is provided; and when the value of the index that has already been set is large, a determination that the vehicle is in the turning condition may be more likely to be made than when the value of the index that has already been set is small.

In the vehicle control system according to the first aspect, when the value of the index that has already been set is a large value at which the running characteristic for enabling the vehicle to run with crispness is provided, the determination that the vehicle is in the turning condition is more likely to be made. This increases the number of occasions where the index is less likely to be changed, or increases the period during which the index is less likely to be changed. Accordingly, even if the longitudinal acceleration and/or the lateral acceleration change(s), the previous running characteristic is more likely to be kept.

In the vehicle control system according to the first aspect, the index may be set to a large value when the running characteristic for making the behavior of the vehicle crisp is provided, and the index may be set to a small value when the running characteristic for making the behavior of the vehicle mild is provided; and when the value of the index that has already been set is large, a longitudinal acceleration of the vehicle may be less likely to be reflected by a change of the index or a change of the running characteristic than when the value of the index that has already been set is small.

In the vehicle control system according to the first aspect, when the value of the index that has already been set is a large value at which the running characteristic for enabling the vehicle to run with crispness is provided, the determination that the vehicle is in the turning condition is more likely to be made. This increases the number of occasions where the index is less likely to be changed, or increases the period during which the index is less likely to be changed. Accordingly, even if the longitudinal acceleration and/or the lateral acceleration change(s), the previous running characteristic is more likely to be kept.

In the vehicle control system, it may be determined whether the vehicle is in the turning condition, by comparing a longitudinal acceleration of the vehicle with a lateral acceleration of the vehicle.

Therefore, in the vehicle control system according to the first aspect, it is determined whether the vehicle is in the turning condition by comparing the longitudinal acceleration with the lateral acceleration, for example, by obtaining a difference or ratio between the longitudinal acceleration and the lateral acceleration.

In the vehicle control system according to the first aspect, the index may be set to a large value when the running characteristic for making the behavior of the vehicle crisp is provided, and the index may be set to a small value when the running characteristic for making the behavior of the vehicle mild is provided; and when the value of the index that has already been set is small, the value of the index may be more likely to be reduced than when the value of the index that has already been set is large.

In the vehicle control system according to the first aspect, when the value of the index is a small value at which the running characteristic for enabling the vehicle to run with less crispness is provided, it is considered that crisper running is not required, and therefore, the reduction of the index is facilitated or accelerated, for example, the other condition (i.e., the index reduction condition) is more likely to be satisfied.

In the vehicle control system according to the first aspect, the index may be set to a large value when the running characteristic for making the behavior of the vehicle crisp is provided, and the index may be set to a small value when the running characteristic for making the behavior of the vehicle mild is provided; and in a case where the value of the index is reduced, when the value of the index that has already been set is small, the value of the index may be reduced at a larger rate than when the value of the index that has already been set is large.

In the vehicle control system according to the first aspect, when the value of the index is a small value at which the running characteristic for enabling the vehicle to run with less crispness is provided, it is considered that crisper running is not required, and therefore, the reduction of the index is facilitated or accelerated, for example, the other condition (i.e., the index reduction condition) is more likely to be satisfied.

In the vehicle control system according to the first aspect, it may be determined whether the vehicle is in the turning condition, based on a tire friction circle relating to the vehicle.

In the vehicle control system according to the first aspect, it is determined whether the vehicle is in the turning condition or whether the vehicle is to turn, based on the tire friction circle relating to the vehicle. Therefore, it is possible to easily or accurately determine whether the vehicle is in the turning condition. Also, it is possible to make the determination more suitable for the control of the behavior of the vehicle.

In the vehicle control system according to the first aspect, it may be determined whether the vehicle is in the turning condition, based on the tire friction circle that indicates a composite acceleration into which accelerations in at least two directions are combined, the accelerations in at least two directions including a longitudinal acceleration and a lateral acceleration of the vehicle.

In the vehicle control system according to the first aspect, it may be determined whether the vehicle is in the turning condition, based on at least one of road information relating to a road on which the vehicle is running, a steering angle of the vehicle, a difference between rotational speeds of right and left wheels, and a yaw rate generated in the vehicle.

In the vehicle control system according to the first aspect, it is possible to determine whether the vehicle is in the turning condition, based on data or information used in various controls relating to the vehicle.

A second aspect of the invention relates to a vehicle control system in which an index used to set a running characteristic of a vehicle is obtained based on a running condition of the vehicle, and a change of the index that makes behavior of the vehicle crisper is more likely to occur than a change of the index that makes the behavior of the vehicle milder. In the vehicle control system, when the index is set to a value at which a degree of crispness of the behavior of the vehicle is relatively low, a change of the index that reduces the degree of crispness of the behavior of the vehicle is more likely to occur than when the index is set to a value at which the degree of crispness of the behavior of the vehicle is relatively high.

In the vehicle control system according to the second aspect of the invention, the index may be set to a large value when the running characteristic for making the behavior of the vehicle crisp is provided, and the index may be set to a small value when the running characteristic for making the behavior of the vehicle mild is provided; if a current value of the index obtained based on the current running condition of the vehicle is smaller than a held value of the index that has already been set and has been held, an integral value of a deviation between the current value and the held value may be calculated, and when the integral value exceeds a predetermined threshold value, the value of the index may be reduced; and the threshold value may be set to a smaller value as the held value of the index becomes smaller.

In the vehicle control system according to the second aspect of the invention, even in a case where the deviation between the running characteristic set based on the index and the actual running condition is small, the change of the index is likely to occur as in a case where the deviation is large. Therefore, it is possible to set the running characteristic or index that more accurately reflects the actual running condition.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

In one embodiment of the invention, an index used to set running characteristics is obtained based on a longitudinal acceleration and a lateral acceleration generated in a vehicle. Namely, the longitudinal acceleration is generated in accordance with an accelerating operation, a braking operation, and a steering wheel operation performed by the driver. The lateral acceleration is generated due to a steering operation performed by the driver. Therefore, it is considered that these accelerations or the running conditions represent the running orientation or preferences of the driver. Accordingly, in the embodiment, the accelerations or the running conditions are reflected by the running characteristics. The running characteristics are, for example, a relationship of an output of a driving power source with respect to an accelerator pedal stroke, a relationship of a speed ratio with respect to the accelerator pedal stroke, and a relationship of the amount of steering assist with respect to a steering angle. The running characteristics include sporty running characteristics for enabling the behavior of the vehicle to change with high crispness, and running characteristics contrary to the sporty running characteristics, that is, comfortable or normal running characteristics for enabling the vehicle to accelerate/decelerate or turn gently. In a case where the index is increased as the longitudinal acceleration and/or the lateral acceleration increase(s), the running characteristics change to the sporty running characteristics, as the index increases.

In the embodiment, when the index larger than the previous value is obtained, the index is updated to the new large value. However, the index is not reduced simply because the index smaller than the previous value is obtained. When the index smaller than the previous value is obtained, and a predetermined other condition (i.e., an index reduction condition) is satisfied, the index is reduced. Namely, the index is increased promptly, and in contrast, the reduction of the index is delayed. Namely, the index, which has been increased to provide a crisp running characteristic, is held.

In the embodiment, because the index reflects not only the longitudinal acceleration but also the lateral acceleration, the lateral acceleration during turning may become a factor that changes the index. However, the previous index is held during turning, because it is considered that if the index were changed during turning, the running characteristics would be changed during turning, and the behavior of the vehicle would be changed due to the change of the running characteristics during turning, and further, it is considered that the changes of the accelerations during turning may not necessarily reflect the driving orientation.

Figure 1:
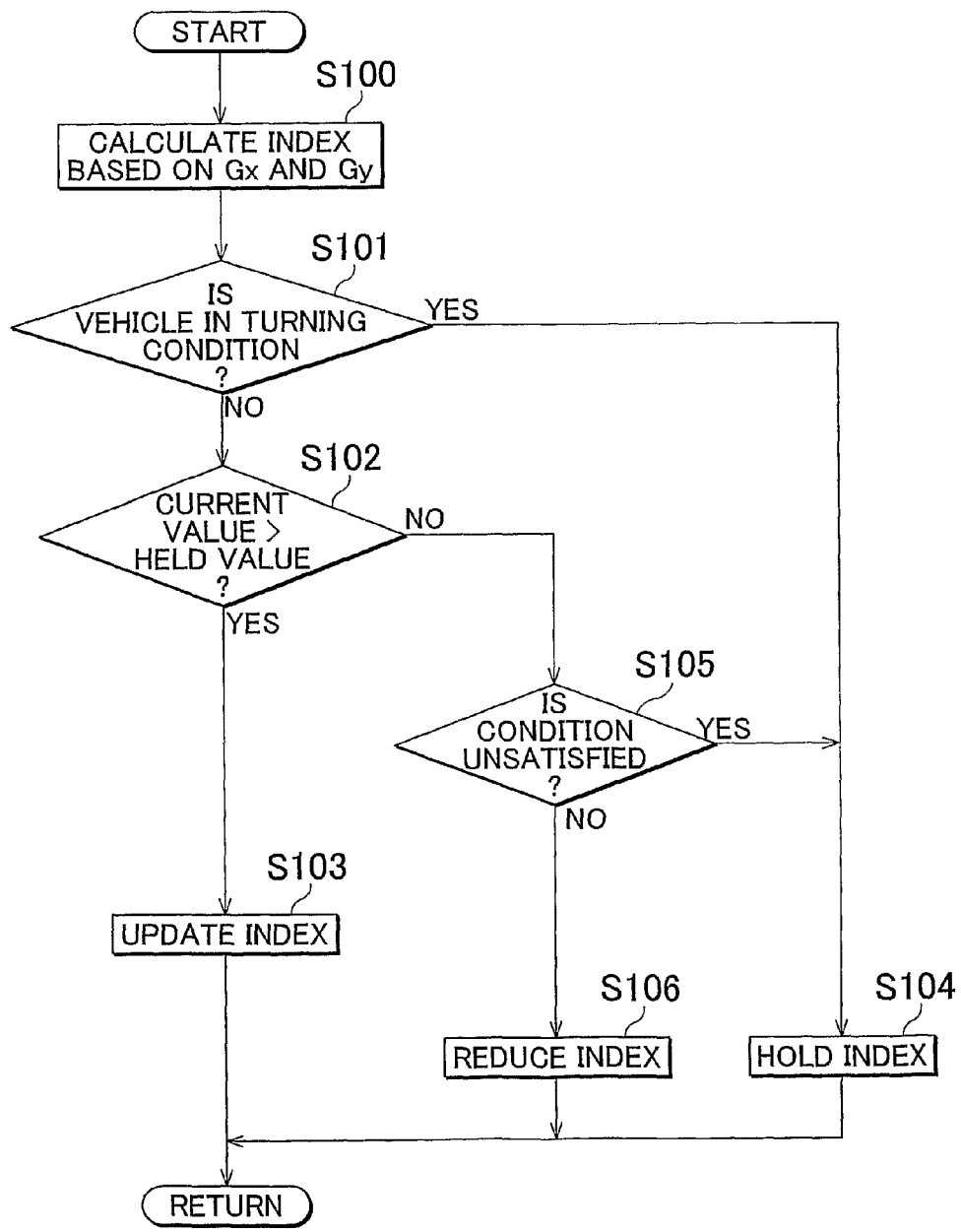
FIG. 1 is a flowchart useful for explaining an example of a control executed by a vehicle control system according to one embodiment of the invention.

FIG. 1 is a flowchart showing the control. First, the index is calculated based on the longitudinal acceleration Gx and the lateral acceleration Gy (step S100). The accelerations Gx and Gy may be values detected by an acceleration sensor disposed in the longitudinal direction of the vehicle and an acceleration sensor disposed in the lateral direction of the vehicle. Also, the accelerations Gx and Gy may be obtained from a value obtained by a single acceleration sensor positioned to be inclined relative to the longitudinal direction of the vehicle. Also, the accelerations Gx and Gy may be calculated based on changes in the vehicle speed and the position obtained by a Global Positioning System (GPS).

Next, it is determined whether the vehicle is in a turning condition (step S101). The turning condition is a condition in which the rate of change of the direction of the vehicle toward the right or left, such as a turning rate or a yaw rate, is equal to or larger than a predetermined value. A threshold value used to determine whether the vehicle is in the turning condition may be suitably set in the design. It may be determined whether the vehicle is in the turning condition, based on road information obtained by a navigation system or the like, and/or a steering angle. Further, it may be determined whether the vehicle is in the turning condition, based on the longitudinal driving force and the lateral force generated in the vehicle, or the longitudinal acceleration and the lateral acceleration generated in the vehicle, and values thereof on a tire friction circle. If the vehicle is not in the turning condition, and therefore, a negative determination is made in step S101, it is determined whether the current value of the index is larger than the previous value (or the held value) (step S102). If the current value of the index is larger than the previous value (or the held value), and therefore, an affirmative determination is made in step S102, the value of the index is updated to the current value (step S103), and then, the control returns.

If it is determined that the vehicle is in the turning condition, that is, an affirmative determination is made in step S101, the index is held at the previous value (step S104). Namely, the change of the index is restricted or constrained. Instead of completely inhibiting the change of the index, the change of the index may be restricted or constrained in a manner such that, for example; a time during which the index is held is set to a predetermined time, or the value of the index obtained based on the accelerations Gx and Gy is changed by a predetermined degree.

If a negative determination is made in step S102, that is, if the value of the index obtained from the accelerations Gx and Gy is equal to or smaller than the previous value or the held value, it is determined whether a predetermined condition is satisfied (step S105). The condition is a condition for reducing the value of the index. For example, the condition is that a predetermined time has elapsed after a negative determination is made in step S102 or that the integral value of a deviation between the current value of the index and the held value of the index exceeds a predetermined threshold value. If a positive determination is made in step S105, the condition for reducing the index is not satisfied, and therefore, the control proceeds to the above-described step S104. In step S104, the index is held at the previous value. In contrast, if a negative determination is made in step S105, the index is reduced (step S106), because the driving orientation of the driver represented by the accelerations Gx and Gy has become different from the running characteristics based on the held index, and thus, the so-called sportiness has decreased. It is to be noted that when the index is reduced, the manner in which the index is reduced by the control may be appropriately set. For example, the index may be reduced by a certain value at each time, or the rate of reduction may be changed in accordance with the value to which the index has been held. Further, the rate of reduction may be changed in accordance with the above-described deviation.

Figure 18:
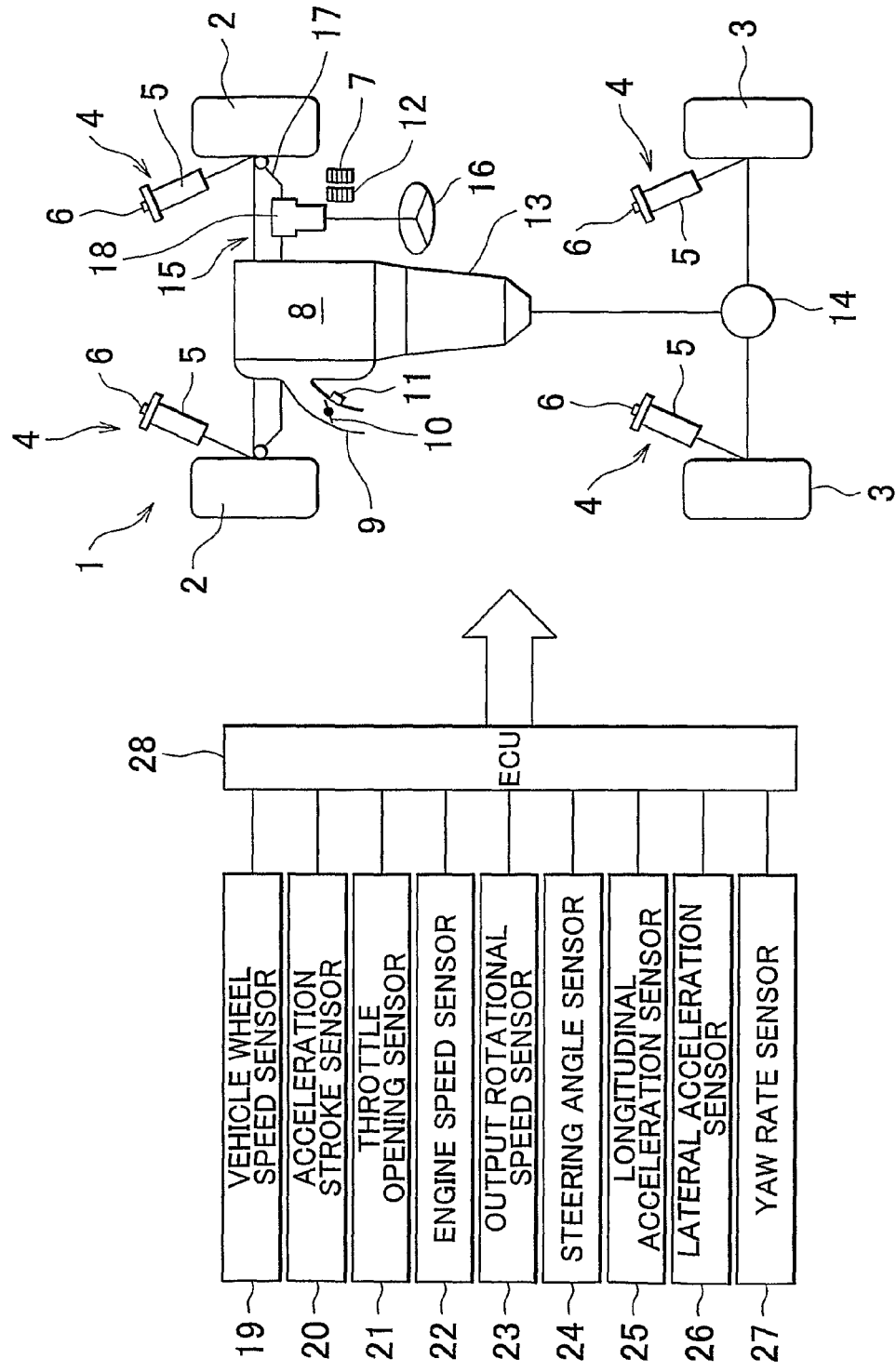
FIG. 18 is a view schematically showing one example of a vehicle to which the present invention can be applied.

In the following, the above-described control, that is, a vehicle control system according to one embodiment of the present invention will be more specifically described. First, examples of vehicles to which the embodiment is applied will be described. The embodiment is applied to vehicles that accelerate, decelerate, and make turns in accordance with the driver's operations, and a typical example of the vehicles is an automobile having an internal combustion engine and/or a motor as a driving power source. One example of the vehicle is illustrated in the block diagram of FIG. 18. The vehicle 1 shown in FIG. 18 includes four wheels, i.e., two front wheels 2 as steerable wheels, and two rear wheels 3 as driving wheels. Each of the four wheels 2, 3 is mounted on the vehicle body (not shown) via a suspension system 4. The suspension system 4 consists principally of a spring and a shock absorber (damper), like a generally known suspension system, and the shock absorber 5 is illustrated in FIG. 18. The shock absorber 5 shown in FIG. 18 is arranged to perform a shock-absorbing or buffering action, using the flow resistance of a fluid, such as gas or liquid, and is constructed such that the magnitude of the flow resistance can be changed by an actuator, such as a motor 6. When the flow resistance is increased, the vehicle body is less likely to squat down, thus giving rise to a hard or harsh ride, and the vehicle behaves as if it provides a reduced ride comfort and an increased sporty feel. The suspension system 4 may be arranged to adjust the vehicle height, by supplying or discharging pressurized gas to or from the shock absorber 5.

Each of the front and rear wheels 2, 3 is provided with a braking device (not shown). When a brake pedal 7 located at the driver's seat is depressed, the braking devices operate to give braking force to the front and rear wheels 2, 3.

The driving power source of the vehicle 1 is a generally known driving power source, such as an internal combustion engine, a motor, or a combination thereof. An internal combustion engine (or engine) 8 is installed on the vehicle shown in FIG. 18, and a throttle valve 10 for controlling the amount of intake air is disposed in an intake pipe 9 of the engine 8. The throttle valve 10, which is an electronic throttle valve, is arranged to be opened and closed by an electrically controlled actuator 11, such as a motor, so that the opening of the throttle valve 10 is adjusted as required. The actuator 11 is arranged to operate in accordance with the amount of depression of an accelerator pedal 12 located at the driver's seat, i.e., the accelerator pedal stroke, so as to control the opening of the throttle valve 10 to a certain throttle opening.

The relationship between the accelerator pedal stroke and the throttle opening can be set as appropriate. As the relationship between these quantities is closer to a one-to-one relationship, the driver is more likely to feel the relationship directly, and the vehicle provides a sporty feel or ride as a running characteristic. To the contrary, if the relationship is set such that the throttle opening is small relative to the accelerator pedal stroke, the running characteristic of the vehicle becomes mild In the case where a motor is used as the driving power source, an electric current controller, such as an inverter or a converter, is provided in place of the throttle valve 10, and the current is controlled in accordance with the accelerator pedal stroke. Also, the relationship between the current value and the accelerator pedal stroke, namely, the running characteristic, is changed as appropriate.

A transmission 13 is coupled to the output side of the engine 8. The transmission 13 is arranged to suitably change the speed ratio, i.e., the ratio between the input rotational speed and the output rotational speed. For example, the transmission 13 is a generally known automatic transmission having two or more gear positions, or a continuously variable transmission, such as a belt-and-pulley type CVT or a toroidal type CVT. The transmission 13 includes an actuator (not shown), and the actuator is suitably controlled so as to change the speed ratio stepwise (in steps), or change the speed ratio continuously. More specifically, a shift map is prepared in advance in which the speed ratio is determined in relation to vehicle conditions, such as the vehicle speed and the accelerator pedal stroke, and the shift control is performed according to the shift map. Alternatively, a target output or power is calculated based on vehicle conditions, such as the vehicle speed and the accelerator pedal stroke, and a target engine speed is obtained from the target output and the optimum fuel line. Then, shift control is performed so as to achieve the target engine speed.

In contrast to the basic shift control as described above, control that gives a higher priority to fuel economy or control for increasing the driving force can be selected. Under the control that gives a higher priority to fuel economy, upshifting is executed at a relatively low vehicle speed, or a relatively high-speed gear ratio or speed ratio is used at a low vehicle speed. Under the control for improving the driving force or acceleration characteristic, upshifting is executed at a relatively high vehicle speed, a relatively low-speed gear ratio or speed ratio is used at a high vehicle speed. These controls may be performed by switching shift maps, or correcting the requested amount of driving force, or correcting the calculated speed ratio. A power transmitting mechanism, such as a torque converter equipped with a lock-up clutch, may be provided as needed between the engine 8 and the transmission 13. The output shaft of the transmission 13 is coupled to the rear wheels 3 via a differential gear 14 serving as a final drive.

A steering mechanism 15 operable to turn the front wheels 2 will be described. A steering linkage 17 is provided for transmitting rotary motion of the steering wheel 16 to the right and left front wheels 2, and an assist mechanism 18 is provided for increasing steering force in relation to the steering angle of the steering wheel 16. The assist mechanism 18 includes an actuator (not shown), and is arranged to adjust the amount of assist force or torque provided by the actuator. Accordingly, as the amount of assist force decreases, the relationship between the steering angle and the actual turn angle of the front wheels 2 becomes closer to a one-to-one relationship, thus making the driver feel more directly about the steering and providing a sporty feel or ride as a running characteristic of the vehicle.

Although not particularly illustrated in the drawings, the vehicle 1 is provided with an anti-lock brake system (ABS), traction control system, and/or a vehicle stability control system (VSC) that controls these systems in an integrated manner, as a system for stabilizing the behavior or posture of the vehicle 1. These systems are those generally known in the art, and are arranged to prevent or suppress locking or slipping of the vehicle wheels 2, 3 and stabilize the behavior of the vehicle, by reducing braking force applied to the wheels 2, 3 based on a difference between the vehicle body speed and the vehicle wheel speed, or applying braking force to the wheels 2, 3, and controlling the engine torque in addition to the control of the braking force. The vehicle 1 may also be provided with a navigation system capable of obtaining data (i.e., running environment) concerning a road on which the vehicle is running or a road or route along which the vehicle is supposed to run, and a switch for manually selecting a running mode from, for example, a sporty mode, normal mode and a low-fuel-consumption mode (eco mode). Furthermore, the vehicle 1 may be equipped with a four-wheel driving mechanism (4WD) capable of changing running characteristics, such as a hill climbing ability, acceleration performance or accelerating ability, and a turning ability.

Various sensors are provided for obtaining data used for controlling the above-mentioned engine 8, transmission 13, shock absorber 5 of the suspension system 4, assist mechanism 18, and the above-described systems that are not illustrated. The sensors include, for example, a vehicle wheel speed sensor 19 that detects the rotational speeds of the front and rear wheels 2, 3, an acceleration stroke sensor 20, a throttle opening sensor 21, an engine speed sensor 22, an output rotational speed sensor 23 that detects the rotational speed of the output shaft of the transmission 13, a steering angle sensor 24, a longitudinal acceleration sensor 25 that detects the longitudinal acceleration (Gx), a lateral acceleration sensor 26 that detects the acceleration (lateral acceleration Gy) of the lateral direction (width direction), a yaw rate sensor 27, and so forth. In this connection, acceleration sensors used in vehicle behavior control of the anti-lock brake system (ABS), vehicle stability control system (VSC), or the like may also be used as the acceleration sensors 25, 26. In a vehicle installed with an airbag(s), acceleration sensors provided for control of deployment of the airbag(s) may also be used as the acceleration sensors 25, 26. Also, the longitudinal and lateral accelerations Gx, Gy may be obtained by dissolving a detection value detected by acceleration sensor positioned to be inclined at a given angle (e.g., 45°) relative to the longitudinal direction of the vehicle, on a horizontal plane, into a longitudinal acceleration and a lateral acceleration. Also, the longitudinal and lateral accelerations Gx, Gy may be calculated based on the accelerator pedal stroke, vehicle speed, road load, steering angle, etc., instead of being detected by the sensors. These sensors 19 to 27 are arranged to transmit detection signals (data) to an electronic control unit (ECU) 28, and the electronic control unit 28 is configured to perform calculations according to the above data, pre-stored data and programs, and output the results of calculations as control command signals to the above-described systems or actuators thereof. The composite acceleration is not limited to the acceleration including the acceleration components in a plurality of directions, such as the acceleration including the acceleration component in the longitudinal direction of the vehicle and the acceleration component in the width direction (lateral direction) of the vehicle. The acceleration in only one direction may be employed as the composite acceleration. For example, only the acceleration in the longitudinal direction of the vehicle may be employed as the composite acceleration.

The vehicle control system according to the present invention is configured to cause a running condition of the vehicle to be reflected by the behavior control of the vehicle. The running condition of the vehicle mentioned herein is represented by the longitudinal acceleration or lateral acceleration, or acceleration of yawing or rolling, or a composite acceleration into which accelerations in the two or more directions are combined. When the vehicle runs at a target speed or travels in a target direction, or when the behavior of the vehicle is returned to the original state in response to an influence of a running environment, such as a road surface, accelerations normally arise in two or more directions. In view of this fact, it is considered that the running condition of the vehicle reflects the running environment or the driving orientation by some degree. On the basis of the background, the vehicle control system of the present invention is configured so that the behavior control of the vehicle reflects the running condition of the vehicle.

As described above, the behavior of the vehicle includes, for example, an acceleration characteristic, turning characteristic, support rigidity (i.e., the degree or likelihood of bumping or rebounding) provided by the suspension system 4, the degree of rolling or pitching, and so forth. The vehicle control system according to the present invention changes these running characteristics based on the above-described running condition. In this case, the running characteristics may be changed by using an acceleration in a certain direction or a composite acceleration as it is, as one example of the above-described running condition. However, in order to reduce uncomfortable feeling, an index obtained by correcting the above-mentioned acceleration or composite acceleration may be used. In one embodiment of the invention, the correction is made by replacing the above-mentioned acceleration or composite acceleration with an index, and the running characteristics are changed according to the index.

A sportiness index SPI as one example of the index will be described. The sportiness index SPI is the index indicating the driver's intention or the running condition of the vehicle. The sportiness index SPI that can be employed in the embodiment is an index obtained by combining accelerations (in particular, their absolute values) of two or more directions, and an acceleration obtained by combining the longitudinal acceleration Gx and the lateral acceleration Gy is an example of acceleration that is greatly related with the behavior of the vehicle in the running direction. For example, an instantaneous SPI is calculated according to the following equation (1). Here, the "instantaneous SPI" means an index, or a physical quantity, which is calculated based on the accelerations in respective directions, each of which is obtained at intervals of a moment during running of the vehicle. The "intervals of a moment" means the intervals of repetition at which the detection of the accelerations and the calculation of the instantaneous SPI based on the accelerations are repeatedly carried out in a given cycle time.

$$\text{Instantaneous SPI} = (Gx^2 + Gy^2)^{1/2} \tag{1}$$

Of the longitudinal acceleration Gx used in the above-indicated equation (1), at least one of the acceleration-side acceleration and deceleration-side acceleration (i.e., deceleration) may be subjected to a normalization operation or a weighting operation. Namely, while the deceleration-side acceleration is larger than the acceleration-side acceleration in general vehicles, the difference is hardly felt or recognized by the driver, and, in many cases, the driver recognizes the acceleration-side and deceleration-side accelerations as being substantially equally applied to the vehicle. The normalization operation is an operation to reduce or eliminate the difference between the actual values and the way the driver feels. For the longitudinal acceleration Gx, the normalization is an operation to increase the acceleration-side acceleration, or reduce the deceleration-side acceleration. More specifically, the ratio of the maximum values of these accelerations is obtained, and the acceleration-side or deceleration-side acceleration is multiplied by the ratio. Also, the weighting operation may be performed to correct the deceleration-side acceleration relative to the lateral acceleration. In sum, the weighting operation is to make a correction by, for example, assigning a weight to at least one of the longitudinal (frontward and backward) accelerations, so that the maximum acceleration in each direction lies on a circle of a given radius, as is the case where the longitudinal driving force and lateral force that can be produced by a tire are represented by a tire friction circle. Through the normalization operation and the weighting operation as described above, the degrees by which the acceleration-side acceleration and deceleration-side acceleration are reflected by the running characteristics become different from each other. Because the lateral acceleration may become larger than the acceleration-side acceleration, the lateral acceleration may also be subjected to the weighting operation. A speed-decreasing longitudinal acceleration and a speed-increasing longitudinal acceleration may be subjected to the weighting operation, as one example of the weighting operation, so that the degree of influence of the speed-increasing longitudinal acceleration is higher than the degree of influence of the speed-decreasing longitudinal acceleration.

Thus, there is a difference between the actual value of the acceleration and the way the driver feels about the acceleration, depending on the direction of the acceleration. For example, such a difference may exist in the acceleration in the yawing direction or rolling direction and the longitudinal direction. According to the embodiment, therefore, the degrees by which the accelerations in different directions are reflected by the running characteristics may be varied, in other words, the degree of change of the running characteristics based on the acceleration in a certain direction may be made different from the degree of change of the running characteristics based on the acceleration in another direction.

Figure 2:
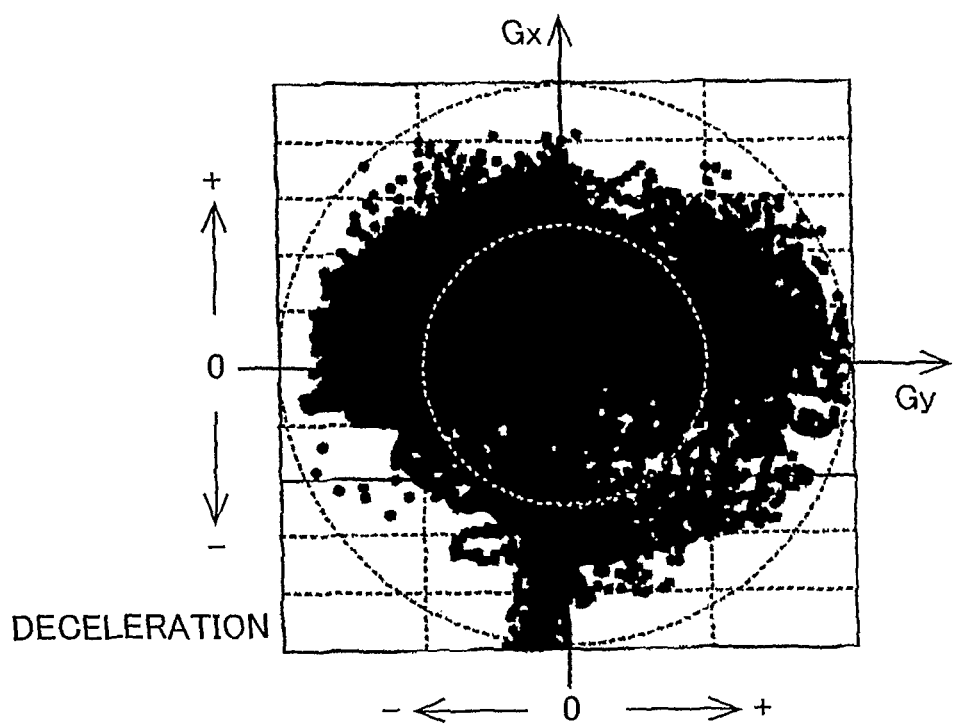
FIG. 2 is a view in which detection values of the longitudinal acceleration and lateral acceleration are plotted on a tire friction circle, according to one embodiment of the invention.

FIG. 2 shows an example in which the sensor value of the lateral acceleration Gy and the longitudinal acceleration Gx on which the above-described normalization operation and weighting operation were performed are plotted on a tire friction circle. This is an example where the vehicle runs along a test course that simulates an ordinary road. It is observed from FIG. 2, as a general tendency, that the lateral acceleration Gy is also likely to become large when the vehicle is decelerated by a large degree, and the longitudinal acceleration Gx and the lateral acceleration Gy occur along the tire friction circle.

Figure 3:
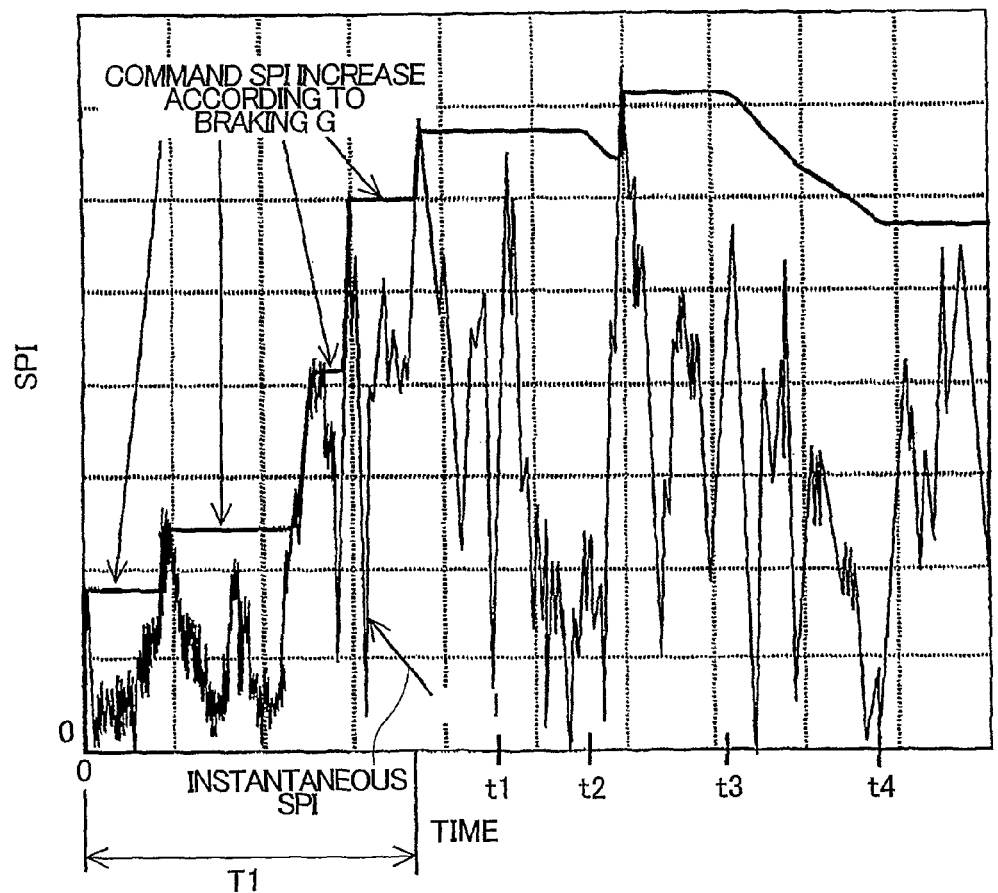
FIG. 3 is a view showing an example of changes in a command SPI based on an instantaneous SPI according to one embodiment of the invention.

According to the embodiment, a command SPI is obtained from the above-indicated instantaneous SPI. The command SPI is an index used in the control for changing the running characteristics. The command SPI immediately increases in response to an increase in the instantaneous SPI based on which the command SPI is calculated, and decreases with delay in response to a reduction in the instantaneous SPI. In particular, the command SPI is reduced when a certain condition is satisfied. FIG. 3 shows changes in the command SPI obtained based on changes in the instantaneous SPI. In the example shown in FIG. 3, the instantaneous SPI is indicated by values plotted in FIG. 2 as described above, whereas the command SPI is set to the maximum value of the instantaneous SPI, and is kept at the same value (i.e., the last value) until a certain condition is satisfied. Namely, the command SPI is an index that changes promptly when it increases, and changes relatively slowly when it decreases.

More specifically, in a time period T1 from the beginning of control in FIG. 3, for example, in the case where the vehicle is decelerating and turning, the instantaneous SPI obtained in each cycle increases and decreases according to the changes in the acceleration. In this period, the instantaneous SPI that exceeds the maximum value of the previous cycles appears before the above-mentioned certain condition is satisfied; therefore, the command SPI increases in steps and the increased command SPI is held. On the other hand, at time t2 and time t3, for example, in the case where the vehicle, which has turned and accelerated, starts to run straight and accelerate, the command SPI is reduced since the condition for reduction is satisfied. Thus, the condition for reducing the command SPI is satisfied when a condition where the command SPI kept at the previous large value is not considered to reflect the driver's intention is established. In the embodiment, the condition is satisfied upon a lapse of a specified time.

Namely, the condition where the command SPI kept at the previous large value is not considered to reflect the driver's intention is a condition in which a deviation between the command SPI that is kept at the previous value and the instantaneous SPI that appears in the meantime is relatively large, and the deviation continues to be large. Accordingly, the command SPI is not reduced due to the instantaneous SPI resulting from, for example, the driver's operation of temporarily releasing the accelerator pedal 12, for example, when the vehicle is controlled to turn and accelerate. When a condition where the instantaneous SPI resulting from, for example, the driver's operation of continuously releasing the accelerator pedal 12 is lower than the kept command SPI continues for a given period of time, for example, when the vehicle gradually decelerates, it is determined that a condition for reducing the command SPI is satisfied. Thus, the condition for starting reducing the command SPI may be the duration for which the instantaneous SPI is kept lower than the command SPI. The condition for starting reducing the command SPI may be that a time integral value (or accumulated value) of a deviation between the kept command SPI and the instantaneous SPI reaches a predetermined threshold value, so that the actual running condition is more precisely reflected by the command SPI. The threshold value may be suitably set by running experiment or simulation. In the latter case where the time integral value is used, the command SPI is reduced in view of the deviation between the command SPI and the instantaneous SPI and time, so that the control for changing the running characteristics can be performed which reflects the actual running condition or behavior more precisely.

In the example as shown in FIG. 3, the length of time for which the command SPI is held at the same value until time t2 is reached is greater than the length of time for which the command SPI is held at the same value until time t3 is reached, since the following control is performed. The command SPI is increased to a given value in the final stage of the above-mentioned time period T1, and is held at the given value; then, the instantaneous SPI is increased at time t1 before the condition for starting reduction as described above is satisfied, and the integral value of a deviation of the instantaneous SPI from the command SPI held at the given value becomes smaller than a predetermined value. The predetermined value may be suitably set by experiment or simulation, or in view of an error in calculation of the instantaneous SPI. Thus, the condition in which the instantaneous SPI becomes close to the command SPI held at the given value means that the running condition at that time is an accelerating or decelerating condition and/or a turning condition that gives rise to the instantaneous SPI based on which the command SPI held at the given value was determined, or a condition close to the accelerating or decelerating condition and/or turning condition. Namely, even if a certain length of time elapses from a point in time at which the command SPI was increased to the value at which the SPI is held, the running condition is approximate to the running condition obtained at a time point before the above-indicated time elapses; therefore, even if the instantaneous SPI is lower than the held command SPI, satisfaction of the condition for starting reduction as described above is delayed, and the command SPI is held at the previous given value. Control or operation for the delay may be performed by resetting the sum (accumulated value) of the elapsed time or the integral value of the deviation as described above, and restarting accumulation of elapsed time or integration of the deviation, or by subtracting a given amount from the sum (accumulated value) or the integral value, or by interrupting the accumulation or integration for a specified period of time.

Figure 4:
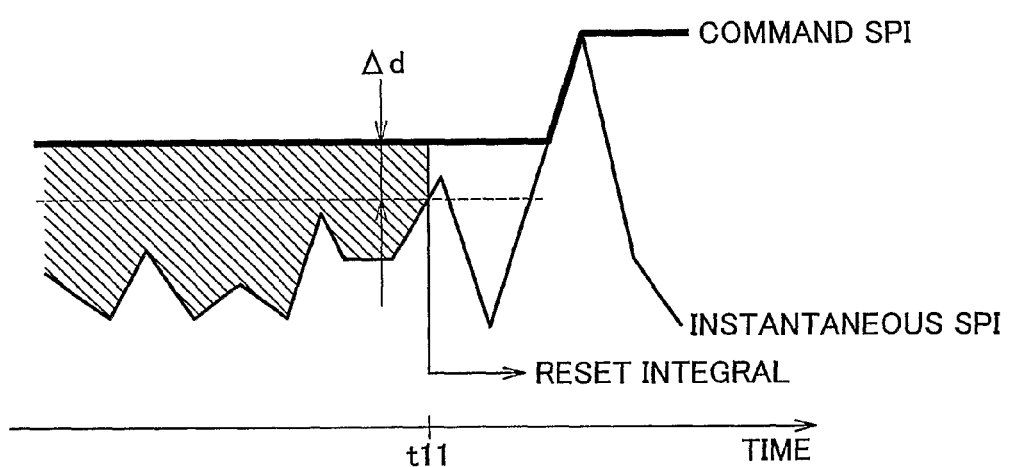
FIG. 4 is a view useful for explaining integration of a deviation between the instantaneous SPI and the command SPI with respect to time, and a situation where the integral value is reset, according to one embodiment of the invention.

FIG. 4 is a schematic view useful for explaining the integration of the above-described deviation and resetting thereof. The area of a hatched portion in FIG. 4 represents the integral value. During the process, the integral value is reset at time t11 at which a difference between the instantaneous SPI and the command SPI becomes equal to or smaller than a predetermined value Δd, and the integration of the difference or deviation is started again. Namely, the integral value is reset based on whether a difference between the instantaneous SPI obtained at this time and the command SPI held at a given value is equal to or smaller than a threshold value. Accordingly, the condition for starting reducing the command SPI is not satisfied, and, therefore, the command SPI is kept at the given value previously obtained. Then, if the instantaneous SPI becomes larger than the held command SPI after the integration is restarted, the command SPI is updated to a large value corresponding to the instantaneous SPI, and is held at this value, and the above-described integral value is reset.

In a case where the condition for starting control for reducing the command SPI is determined based on the above-indicated integral value, the degree or rate of reduction of the command SPI may be varied according to the length of the time lapsed until the condition is satisfied. The above-described integral value is obtained by integrating a deviation between the held command SPI and the instantaneous SPI with respect to time; therefore, if the deviation is large, the integral value reaches the predetermined value in a relatively short time, and the above condition is satisfied. If the deviation is small, it takes a relatively long time for the integral value to reach the predetermined value so that the above condition is satisfied. Accordingly, the degree or rate of reduction of the command SPI may be varied according to the length of the time lapsed until the condition for starting control for reducing the command SPI as described above is satisfied, for example. If the above condition is satisfied in a short time, it means that the instantaneous SPI is smaller by a large degree than the command SPI held at a given value, and the command SPI greatly deviates from the driver's intention at that time. In this case, therefore, the command SPI is reduced by a large degree or at a high rate. To the contrary, if it takes a relatively long time until the above condition is satisfied, it means that the instantaneous SPI is smaller by a small degree than the command SPI held at a given value, and it cannot be said that the held command SPI deviates particularly greatly from the driver's intention at that time. In this case, therefore, the command SPI is slowly reduced by a small degree or at a low rate. It is thus possible to promptly and appropriately correct (reduce or eliminate) a discrepancy between the command SPI for setting the running characteristics and the driver's intention, and set the running characteristics of the vehicle matching the running condition. Accordingly, when the command SPI is reduced, the degree or rate of reduction of the command SPI may be varied according to the length of the elapsed time for which the command SPI has been held. Alternatively, the degree or rate of reduction of the command SPI may be varied according to the difference between the command SPI and the instantaneous SPI.

The above-mentioned command SPI represents running conditions of the vehicle, which include a running environment, such as the gradient of the road surface, the presence of a corner, and the radius of curvature of the corner, and the driving orientation of the driver. Namely, the acceleration of the vehicle changes depending on conditions of the road on which the vehicle is running, while the driver performs accelerating, decelerating and turning operations depending on the conditions of the road, and the acceleration changes in accordance with the driver's operations.

The change of the behavior of the vehicle or the acceleration(s) may be classified into a category, and the degree of difficulty in causing the change of the behavior of the vehicle or the acceleration(s) to be reflected by the index may be changed according to the category to which the change of the behavior of the vehicle or the acceleration(s) is(are) classified. One example will be described. When the driver performs the braking operation, the deceleration corresponding to the braking operation is generated. Accordingly, it is considered that the degree of closeness of the correspondence relation between the braking operation and the deceleration is high. In contrast, when the driver performs the accelerating operation, for example, the driver depresses the accelerator pedal, or when the driver performs the decelerating operation, for example, the driver releases the accelerator pedal, the change of the vehicle speed, that is, the acceleration or the deceleration tends to be slightly smaller than that expected by the driver. Therefore, it is considered that the degree of closeness of the correspondence relation between the accelerating/decelerating operations and the acceleration/deceleration is lower than the degree of closeness of the correspondence relation between the braking operation and the deceleration. Further, in most cases, the driver performs the steering operation due to an external factor such as the condition of a road or the flow of vehicles. Therefore, in most cases, the steering operation does not represent the driving orientation. Thus, it is considered that the degree of closeness of the correspondence relation between the steering operation and the lateral acceleration is lower than the degree of closeness of the correspondence relation between the accelerating/decelerating operations and the acceleration/deceleration. Accordingly, in the example described below, the above-described composite acceleration is classified into the category of acceleration, deceleration, or turning, according to an angle on the tire friction circle. The degree of difficulty in changing the command SPI, that is, the degree, by which the composite acceleration is reflected by the command SPI, is changed according to the category into which the composite acceleration is classified.

Figure 5:
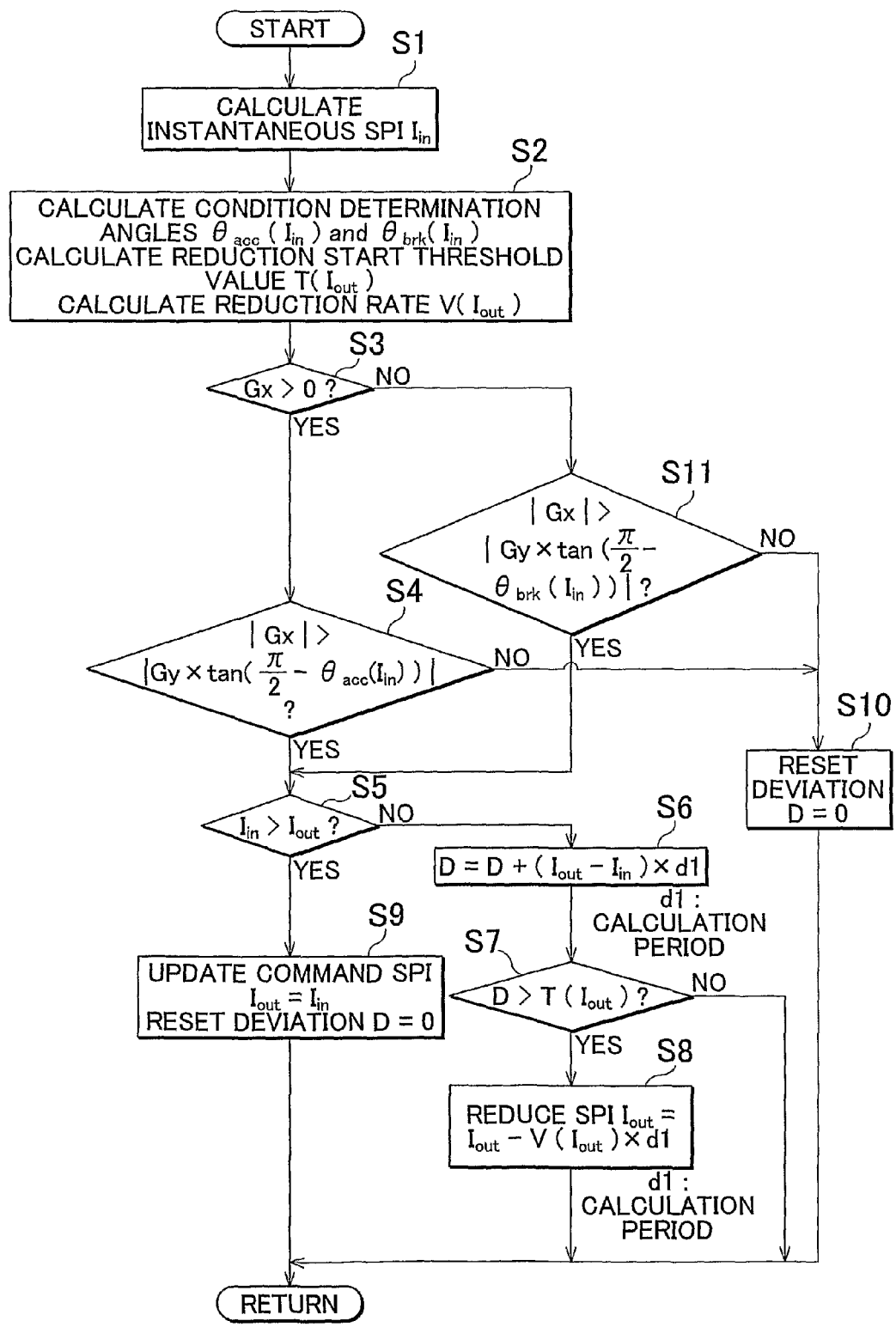
FIG. 5 is a flowchart useful for explaining a more specific example of the control executed by the vehicle control system according to one embodiment of the invention.

FIG. 5 is a flowchart useful for explaining an example of the control. For example, when a main switch or a start switch of the vehicle is turned on, the control is repeatedly executed at predetermined short time intervals. When one of the switches is turned off, data such as the command SPI is initialized. In FIG. 5, first, a value $I_{in}$ of the instantaneous SPI is calculated (step S1). An example of the calculation has been described above.

Figure 6:
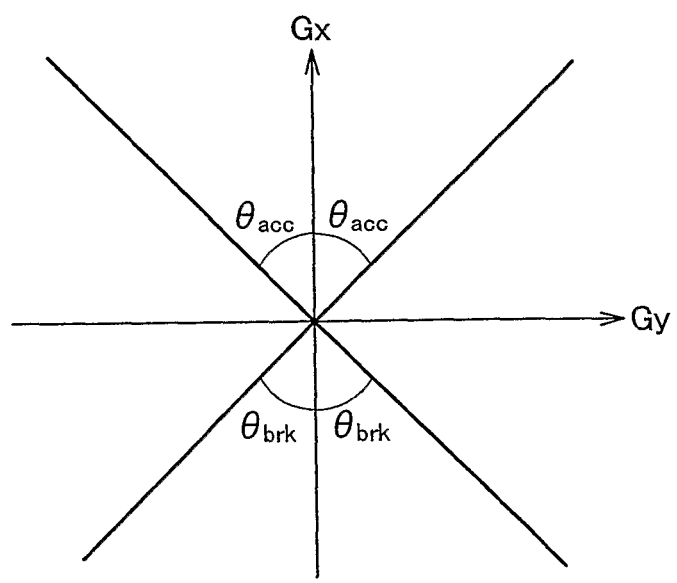
FIG. 6 is a view showing regions on a tire friction circle, which are used to determine that a vehicle is in a turning condition and to determine that the vehicle is in a non-turning condition in the example of the control in FIG. 5.
Figure 7:
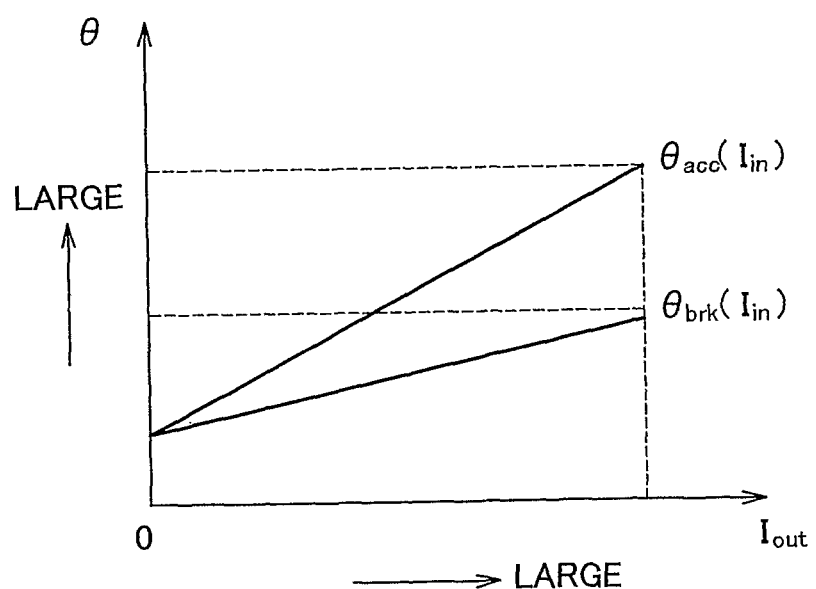
FIG. 7 is a view schematically showing a map used to obtain condition determination angles used in the example of the control in FIG. 5.

Then, angles used to determine the behavior of the vehicle are calculated. More specifically, condition determination angles $\theta_{acc}(I_{in})$ and $\theta_{brk}(I_{in})$ used to determine the condition of the composite acceleration, a reduction start threshold value $T(I_{out})$ at or above which the command SPI is reduced, and a reduction rate (or a reduction degree) $V(I_{out})$ at (to) which the command SPI is reduced are calculated (step S2). The acceleration-side condition determination angle $\theta_{acc}(I_{in})$ is an angle on the right or left side of a line indicating the longitudinal direction on the tire friction circle (refer to FIG. 6). The deceleration-side condition determination angle $\theta_{brk}(I_{in})$ is an angle on the right or left side of the line indicating the longitudinal direction on the tire friction circle (refer to FIG. 6). The condition determination angles $\theta_{acc}(I_{in})$ and $\theta_{brk}(I_{in})$ may be calculated, for example, based on a map that is set in advance, or an equation that is set in advance. In either case, the angles are obtained based on the value $I_{out}$ of the command SPI at that time. As the value $I_{out}$ of the command SPI increases, the condition determination angles $\theta_{acc}(I_{in})$ and $\theta_{brk}(I_{in})$ increase. Namely, when the value $I_{out}$ of the command SPI is small, the determination that the vehicle is in the turning condition is more likely to be made as described later. As a result, the lateral acceleration is less likely to become a factor that changes the command SPI. FIG. 7 shows an example of the map. In the example shown in FIG. 7, when the value $I_{out}$ of the command SPI is "0", the condition determination angles $\theta_{acc}(I_{in})$ and $\theta_{brk}(I_{in})$ are "45°". As the value $I_{out}$ of the command SPI increases, the condition determination angles $\theta_{acc}(I_{in})$ and $\theta_{brk}(I_{in})$ gradually increase. It is to be noted that the acceleration-side condition determination angle $\theta_{acc}(I_{in})$ increases at a larger rate than a rate at which the deceleration-side condition determination angle $\theta_{brk}(I_{in})$ increases. Accordingly, in the example shown in FIG. 7, when the acceleration-side condition determination angle $\theta_{acc}(I_{in})$ is used to determine whether the vehicle is in the turning condition, the number of occasions where it is determined that the vehicle is in the turning condition is small (i.e., the likelihood of determining that the vehicle is in the turning condition is low), as compared to when the deceleration-side condition determination angle $\theta_{brk}(I_{in})$ is used to determine whether the vehicle is in the turning condition.

Figure 8:
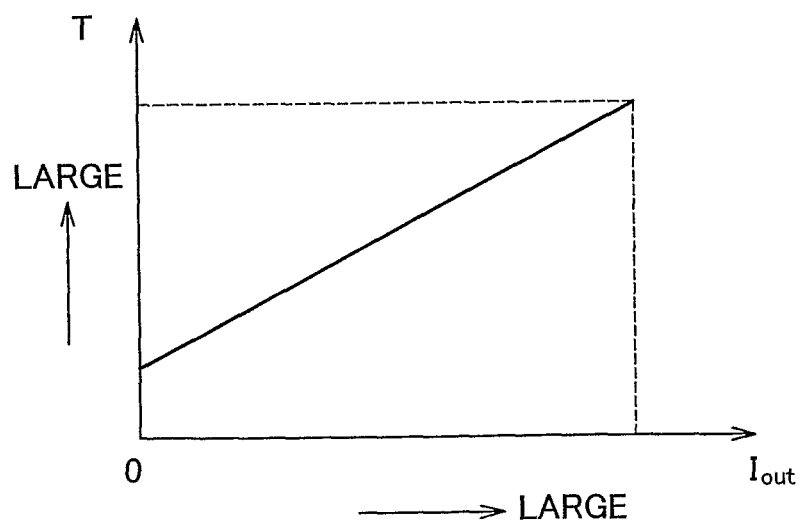
FIG. 8 is a view showing an example of a map used to obtain a reduction start threshold value in the example of the control in FIG. 5.

The reduction start threshold value $T(I_{out})$ is also used to define the length of time during which the command SPI is held at the previous value. As described above, in the case where the period, during which the command SPI is held at the previous value, is controlled based on the integral value of the deviation between the command SPI and the instantaneous SPI, the reduction start threshold value $T(I_{out})$ is a threshold value relating to the integral value. The reduction start threshold value $T(I_{out})$ is set in the form of a map in advance. FIG. 8 shows an example of the map. In the map shown in FIG. 8, as the value $I_{out}$ of the command SPI becomes larger, the reduction start threshold value $T(I_{out})$ becomes larger. In other words, when the value $I_{out}$ of the command SPI is small, and the so-called sportiness is low, it is considered that the mild or comfortable running is required rather than the crisp running, and therefore, the value $I_{out}$ of the command SPI is more likely to be reduced.

Figure 9:
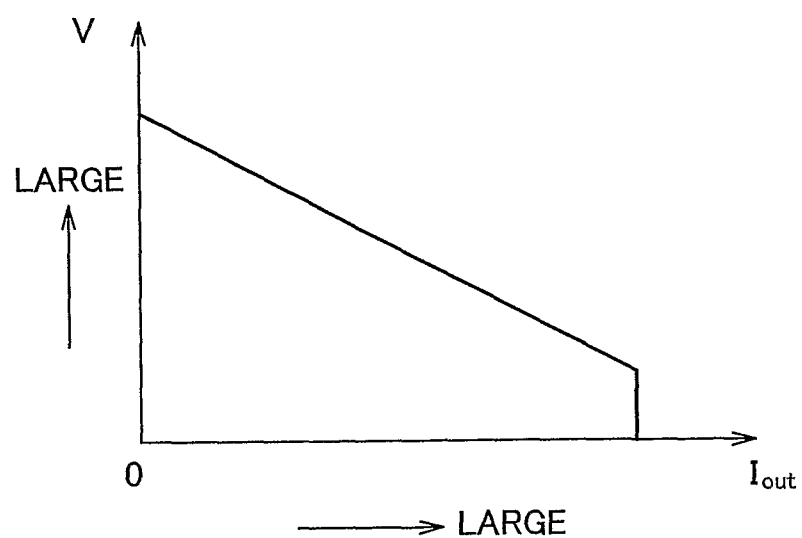
FIG. 9 is a view showing an example of a map used to obtain a reduction rate in the example of the control in FIG. 5.

Further, the reduction rate $V(I_{out})$ at which the value $I_{out}$ of the command SPI is reduced may be obtained based on a map that is set in advance. FIG. 9 shows an example of the map. In the map shown in FIG. 9, as the value $I_{out}$ of the command SPI becomes smaller, the reduction rate $V(I_{out})$ becomes larger so that when the command SPI becomes smaller, the command SPI is reduced at a larger rate.

After the above-described calculations are performed, it is determined whether the vehicle is in the accelerating condition or in the decelerating condition (step S3). More specifically, it is determined whether the vehicle is in the accelerating condition or in the decelerating condition by determining whether the longitudinal acceleration Gx is larger than "0" (Gx>0). If the vehicle is in the accelerating state, and therefore, an affirmative determination is made in step S3, it is determined whether the vehicle is in the turning condition (step S4). It is possible to determine whether the vehicle is in the turning condition based on, for example, the yaw rate, the steering angle or the actual turn angle, and/or positional information obtained by the GPS. However, in the example shown in FIG. 5, it is determined whether the vehicle is in the turning condition by comparing the longitudinal acceleration Gx with the lateral acceleration Gy. More specifically, it is determined whether the vehicle is in the turning condition based on whether the absolute value of the longitudinal acceleration Gx is in a range defined by the above-described acceleration-side condition determination angle $\theta_{acc}(I_{in})$ on the tire friction circle. Namely, it is determined whether the following equation (2) is satisfied.

$$|Gx| > \left|G_y \times \tan\left(\frac{\pi}{2} - \theta_{acc}(I_{in})\right)\right| \qquad (2)$$

If an affirmative determination is made in step S4, the vehicle is not in the turning condition, that is, the vehicle is in a non-turning condition. In this case, it is determined whether the value $I_{in}$ of the instantaneous SPI is larger than the value $I_{out}$ of the command SPI that has already been set (step S5). If a negative determination is made in step S5, that is, if the value of the index obtained from the acceleration(s) at that time is equal to or smaller than the value of the index (i.e., the command SPI) that has already been set or has been held, integration or accumulation of a deviation D is performed (step S6). The deviation D is a difference between the value of the index that is obtained from the running condition of the vehicle at that time, such as the acceleration(s) at that time, and the value of the index that has already been set or has been held. In the described example, the deviation D is a difference between the value $I_{out}$ of the command SPI that has already been set or has been held at that time and the value $I_{in}$ of the instantaneous SPI at that time. The integration or accumulation is performed according to the following equation (3). It is to be noted that d1 is a calculation period in the following equation (3).

$$D=D+(I_{out}-I_{in}) \cdot d1 \qquad (3)$$

The integral value (or accumulated value) thus obtained is compared with the reduction start threshold value $T(I_{out})$ calculated in the above-described step S2 (step S7). Namely, it is determined whether the integral value (or accumulated value) of the deviation D is larger than the reduction start threshold value $T(I_{out})$. The step S7 is a determination step in which it is determined whether "the other condition (i.e., the index reduction condition)" is satisfied. If an affirmative determination is made, the command SPI is reduced (step S8), and then, the control returns. As described above, the reduction start threshold value $T(I_{out})$ is set to be smaller as the value $I_{out}$ of the command SPI held at that time becomes smaller. Therefore, when the value $I_{out}$ of the command SPI is small, that is, when the vehicle runs with no particular crispness, i.e., the vehicle runs mildly, the value $I_{out}$ of the command SPI is more likely to be reduced. The degree of reduction of the command SPI is determined in accordance with the value $I_{out}$ of the command SPI at that time. More specifically, the value $I_{out}$ of the command SPI is reduced based on the following equation (4).

$$I_{out}=I_{out}-V(I_{out}) \cdot d1 \qquad (4)$$

If the integral value (or accumulated value) of the deviation D is equal to or smaller than the reduction start threshold value $T(I_{out})$, and therefore, a negative determination is made in step S7, the control returns. Namely, the integration (or accumulation) of the deviation D is continued.

On the other hand, if an affirmative determination is made in the above-described step S5, that is, if the value $I_{in}$ of the instantaneous SPI at that time is larger than the value $I_{out}$ of the command SPI that has already been set and held, the value $I_{out}$ of the command SPI is replaced by the value $I_{in}$ of the instantaneous SPI that is newly obtained, and thus, the value $I_{out}$ of the command SPI is updated (step S9). At the same time, the integral value (or accumulate value) of the deviation D is reset, and then, the control returns. The command SPI is updated in the manner that has been described with reference to FIG. 3.

If the vehicle is in the turning condition, and therefore, a negative determination is made in the above-described step S4, the integral value (or accumulated value) of the deviation D is reset (step S10), and then, the control returns. Namely, the satisfaction of the condition for reducing the command SPI is delayed or it becomes difficult to satisfy the condition, and therefore, the previous value $I_{out}$ of the command SPI is further held. In other words, the change of the index indicating the sportiness is inhibited or suppressed. When the vehicle is in the non-turning condition, the index indicating the sportiness is more likely to be changed, as compared to when the vehicle is in the turning condition.

If the vehicle is not in the accelerating condition, and therefore, a negative determination is made in the above-described step S3, it is determined whether the vehicle is in the decelerating condition and in the turning condition (step S11). It is possible to determine whether the vehicle is in the turning condition based on, for example, the yaw rate, the steering angle or the actual turn angle, and/or positional information obtained by the GPS. However, in the example shown in FIG. 5, it is determined whether the vehicle is in the turning condition by comparing the longitudinal acceleration Gx with the lateral acceleration Gy. More specifically, it is determined whether the vehicle is in the turning condition based on whether the absolute value of the longitudinal acceleration Gx is in a range defined by the above-described deceleration-side condition determination angle $\theta_{brk}(I_{in})$ on the tire friction circle. Namely, it is determined whether the following equation (5) is satisfied.

$$|Gx| > \left|G_y \times \tan\left(\frac{\pi}{2} - \theta_{brk}(I_{in})\right)\right| \qquad (5)$$

When the value $I_{out}$ of the command SPI is large, the deceleration-side condition determination angle $\theta_{brk}(I_{in})$ is smaller than the acceleration-side condition determination angle $\theta_{acc}(I_{in})$. Therefore, when the deceleration-side condition determination angle $\theta_{brk}(I_{in})$ is used to determine whether the vehicle is in the turning condition, the determination that the vehicle is in the "turning condition" is more likely to be made than when the acceleration-side condition determination angle $\theta_{acc}(I_{in})$ is used to determine whether the vehicle is in the turning condition.

If an affirmative determination is made in step S11, the control proceeds to step S5, and it is determined whether the value $I_{in}$ of the instantaneous SPI is larger than the value $I_{out}$ of the command SPI that has already been set. Then, as in the case where an affirmative determination is made in the above-described step S4, step S6 or S9 is executed. Namely, the value $I_{out}$ of the command SPI that is the index is increased or reduced according to the acceleration(s). In contrast, if the vehicle is in the turning condition, and therefore, a negative determination is made in step S11, the control proceeds to the above-described step S10, and the deviation D is reset, and then, the control returns. Namely, the previous value $I_{out}$ of the command SPI continues to be held, or the previous value $I_{out}$ of the command SPI is more likely to be held.

The instantaneous SPI is calculated based on the so-called actual accelerations or estimated accelerations described above, and the above-mentioned command SPI is determined based on the instantaneous SPI. The command SPI represents running conditions of the vehicle, which include a running environment, such as the gradient of the road surface, the presence of a corner, and the radius of curvature of the corner, and the driving orientation of the driver. Namely, the acceleration of the vehicle changes depending on conditions of the road on which the vehicle is running, while the driver performs accelerating and decelerating operations depending on the conditions of the road, and the acceleration changes in accordance with the driver's accelerating and decelerating operations. The vehicle control system according to the embodiment is configured to use the command SPI for control of the running characteristics of the vehicle. In the embodiment, the running characteristics include an acceleration characteristic, a steering characteristic, a suspension characteristic, a sound characteristic, and so forth, and these characteristics are set as needed by changing a control characteristic of the throttle valve 10, a shift characteristic of the transmission 13, a damping characteristic of the shock absorber 5 of the suspension system 4, an assist characteristic of the assist mechanism 18, etc., by means of actuators provided in the respective components or mechanisms. A general tendency of change of the running characteristics is such that, as the command SPI increases, the running characteristics change so as to enable the vehicle to offer a sporty ride. More specifically, the characteristics that provide a sporty ride include an engine brake characteristic during braking, a characteristic that provides large driving force and quick acceleration, a characteristic that the vehicle body is rigidly supported with relatively small amounts of squatting and lifting, and a characteristic that the amount of assist to steering is small, thus making the driver feel more directly about steering.

Figure 10:
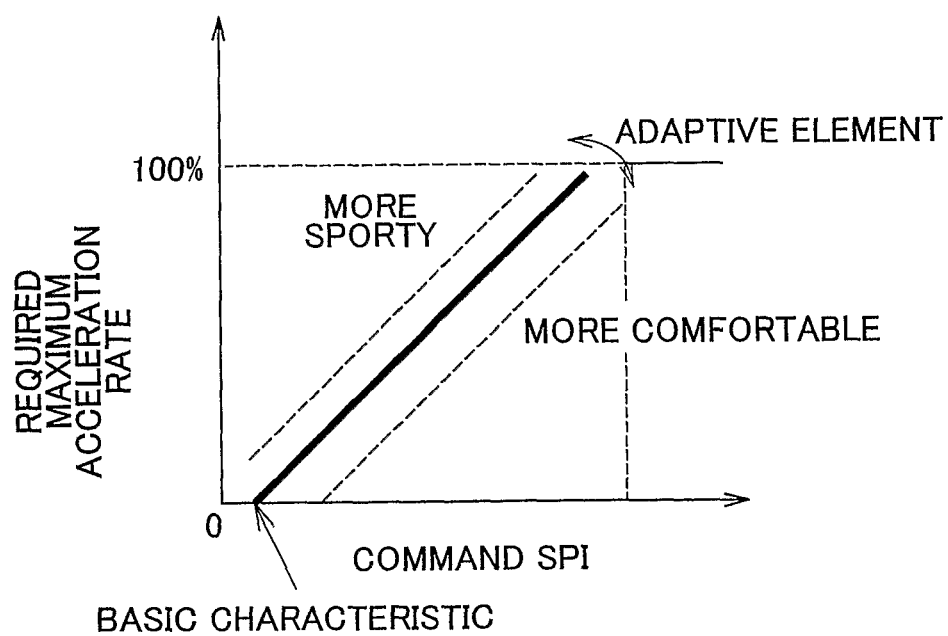
FIG. 10 is a map indicating the relationship between the command SPI and the required maximum acceleration rate according to one embodiment of the invention.

As one example of change of the running characteristics, the acceleration characteristic or performance is changed according to the command SPI in the following manner, as shown in FIG. 10. In this example, the required rate of acceleration corresponding to the command SPI set in the above-described manner is obtained. The required rate of maximum acceleration specifies excess driving force, and the required maximum acceleration rate that is equal to 100% indicates a condition which permits the maximum acceleration that can be generated in the vehicle to be achieved, and in which the speed ratio of the transmission 13 is set to a speed ratio at which the engine speed is maximized, or the largest speed ratio (the speed ratio of the lowest speed). The required maximum acceleration rate that is equal to 50% indicates a condition which permits an acceleration that is a half of the maximum acceleration that can be generated in the vehicle to be achieved, and in which the speed ratio of the transmission 13 is set to an intermediate speed ratio. In the example shown in FIG. 10, the required maximum acceleration rate increases as the command SPI increases. A basic characteristic as indicated by the solid line in FIG. 10 is obtained by calculating the relationship between the command SPI and the required maximum acceleration rate, based on data obtained during actual running of the vehicle, and making corrections as needed through running of an actual vehicle or simulation. When a characteristic line is set on one side of the basic characteristic line on which the required maximum acceleration rate is larger than that of the basic characteristic, the acceleration of the vehicle becomes relatively large, resulting in a sporty running characteristic or acceleration characteristic. To the contrary, when a characteristic line is set on the other side on which the required maximum acceleration rate is smaller than that of the basic characteristic, the acceleration of the vehicle becomes relatively small, resulting in a comfortable running characteristic or acceleration characteristic. The adjustment (i.e., adaptation or tuning) of these characteristics may be done as needed, in accordance with the marketability required of the vehicle. In the basis characteristic, the required maximum acceleration rate is set to zero in a condition where the command SPI is larger than zero, so that a minute-speed running condition, such as a traffic jam or driving into the garage, is prevented from being reflected by control for setting or changing the acceleration characteristic.

Control for changing the acceleration characteristic by causing the above-mentioned required maximum acceleration rate to be reflected by the shift characteristic of the transmission 13 will be described. In a vehicle on which a continuously variable transmission is installed as the transmission 13, or a hybrid vehicle in which the engine speed can be controlled by a motor, a target output or power is calculated based on the vehicle speed and the requested amount of driving force, and the engine speed is controlled so as to achieve the target output or power. The relationship between the vehicle speed and the acceleration for each engine speed is indicated in FIG. 11, and the required maximum acceleration rate obtained from the command SPI based on FIG. 10 as described above is added to the graph of FIG. 11. For example, thick, solid lines in FIG. 11 indicate the required maximum acceleration rates of 100% and 50% thus added. Accordingly, the required engine speed is represented by a line that passes an intersection of a line indicating the required maximum acceleration obtained from the command SPI and a line indicating the vehicle speed detected at this point in time, In the vehicle including the transmission 13 as explained above with reference to FIG. 18, a basic shift map is provided for controlling the speed ratio to be established by the transmission 13. In the shift map for the continuously variable transmission, the speed ratio is set according to the vehicle speed and the engine speed. In one example of the speed ratio control, which is known as torque demand control, the required driving force is obtained from a driving force map, based on the accelerator pedal stroke as the requested amount of driving force and the vehicle speed, for example, and the required power of the engine is obtained from the required driving force and the vehicle speed or the engine speed. A target engine speed at which the required power is generated at the optimum fuel efficiency is obtained based on an engine speed map, and the speed ratio of the continuously variable transmission is controlled so as to achieve the target engine speed. Namely, the transmission 13 functions as an engine speed control mechanism for controlling the rotational speed of the engine as the driving power source. Since the power of the engine is obtained as the product of the torque and the engine speed, the engine torque that achieves the required power is obtained based on the target engine speed or the vehicle speed corresponding to the target engine speed, and a throttle opening that provides the engine torque is calculated.

Figure 11:
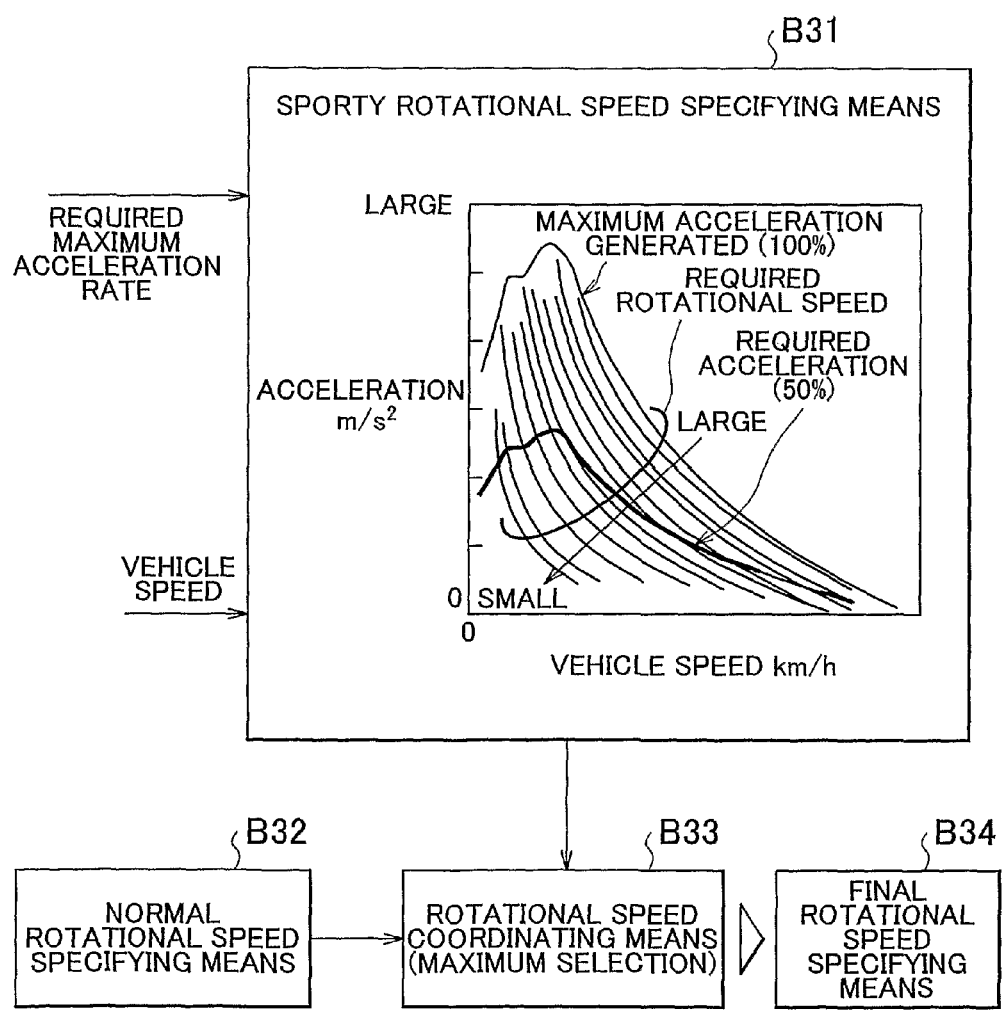
FIG. 11 includes a view in which the required acceleration based on the command SPI is added to a graph indicating the relationship between the vehicle speed and the acceleration for each required rotational speed according to one embodiment of the invention, and a view showing the process of obtaining a finally specified rotational speed based on the above view.

A sporty rotational speed specifying means B31 as shown in FIG. 11 is a means for specifying a required rotational speed (engine speed) obtained based on the command SPI as described above, and may be regarded as the sporty-mode rotational speed calculating means according to the present invention. Also, a normal rotational speed specifying means B32 is a means for specifying a target rotational speed (engine speed) obtained by ordinary engine speed control, such as torque demand control, and may be regarded as the normal-mode rotational speed calculating means according to the present invention. The normal rotational speed and the above-indicated sporty rotational speed are compared (coordinated) by a rotational speed coordinating means B33, and the rotational speed having the larger value is selected, which will be called "maximum selection". A final rotational speed specifying means B34 generates the thus selected rotational speed as a control signal. Accordingly, when the requested amount of driving force represented by the accelerator pedal stroke is small, and therefore, the normal rotational speed is lower than the sporty rotational speed, the sporty rotational speed is maintained. It is to be noted that when the requested amount of driving force exceeds a value corresponding to the required maximum acceleration, for example, when the accelerator pedal is depressed by a large degree, downshifting takes place.

For the continuously variable transmission, the above-described control is shift control that aims to establish a lower-vehicle-speed speed ratio (speed ratio having a larger value). As the speed ratio increases under the control, the maximum driving force or engine brake force becomes large, and the behavior of the vehicle is controlled with high responsiveness, thus providing a characteristic that offers a sporty ride, or a characteristic that meets with the driving orientation of the driver or a running environment, such as a condition of the road on which the vehicle is running. In the vehicle on which the continuously variable transmission is installed, the above-described control may be executed when a sporty mode is selected with a mode selection switch installed on the vehicle.

Figure 12:
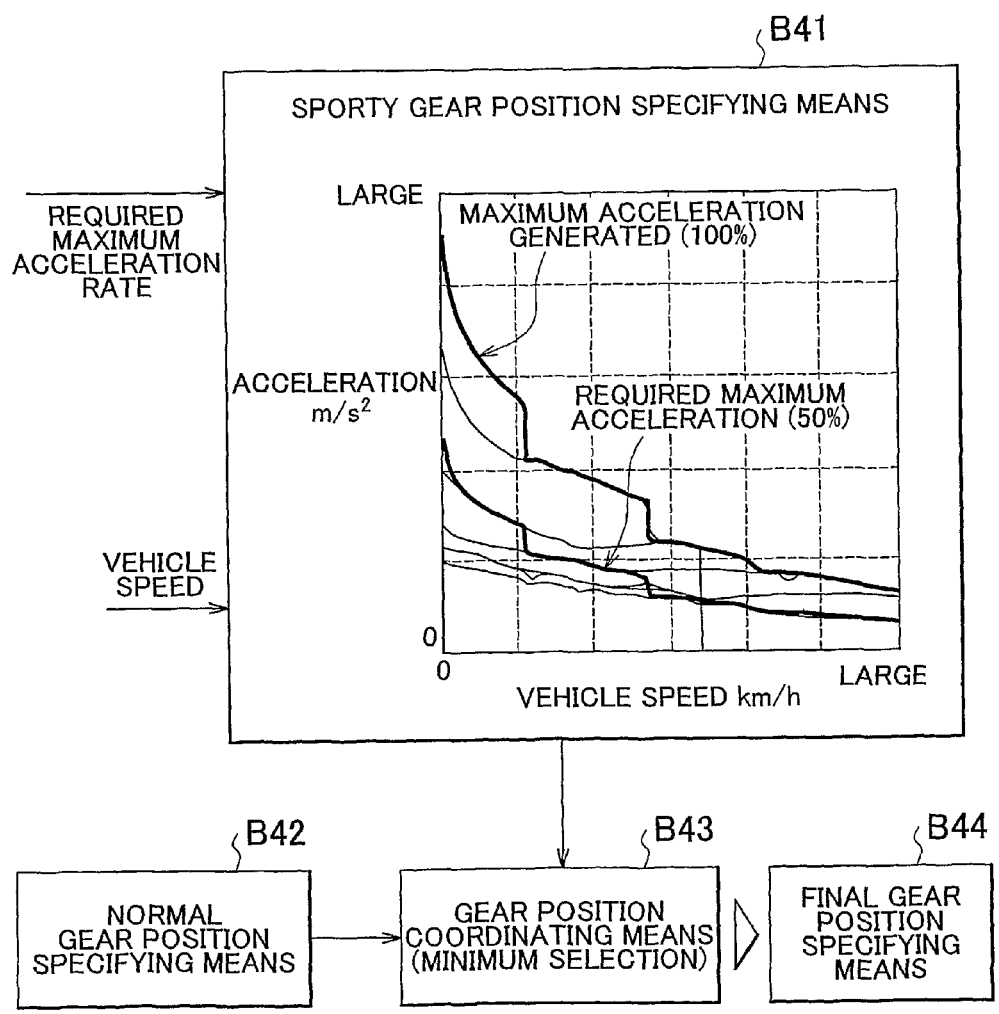
FIG. 12 includes a view in which the required acceleration based on the command SPI is added to a graph indicating the relationship between the vehicle speed and the acceleration for each gear position, and a view showing the process of obtaining a finally specified gear position based on the above view.

On the other hand, the transmission 13, when it has two or more gear positions, is controlled as shown in FIG. 12. In the shift control of the transmission having two or more gear positions, a target gear position is determined, and a control command signal is generated to an actuator of the transmission 13 so as to establish the gear position. FIG. 12 shows the relationship between the vehicle speed and the acceleration for each gear position. Thick solid lines added to the graph of FIG. 12 indicate the required maximum accelerations of 100% and 50% as the required maximum acceleration rates obtained from the command SPI. Accordingly, a target gear position is represented by a line of the gear position which is closest to an intersection of a line indicating the required maximum acceleration obtained from the command SPI and a line indicating the vehicle speed detected at this point in time.

When control is executed by the vehicle control system according to the embodiment, the target sporty gear position obtained in FIG. 12 and a target normal gear position based on a shift diagram prepared in advance (for example, the speed ratio determined based on the accelerating operation and the vehicle speed) are compared (coordinated), and the lower-vehicle-speed gear position having the larger speed ratio is selected, which will be called "minimum selection". As the speed ratio increases under the control, the maximum driving force or engine brake force becomes large, and the behavior of the vehicle is controlled with high responsiveness. The target normal gear position of the transmission having two or more gear positions is set based on the shift diagram (shift map) in which a region of each gear position is defined by the requested amount of driving force, such as an accelerator pedal stroke, and the vehicle speed. Accordingly, downshifting takes place when the requested amount of driving force exceeds a value corresponding to the required maximum acceleration, for example, when the accelerator pedal is depressed by a large degree, and upshifting can take place when the vehicle speed increases.

A sporty gear position specifying means B41 as shown in FIG. 12 is a means for specifying a gear position obtained based on the above-described command SPI, and a normal gear position specifying means B42 is a means for specifying a gear position obtained based on an ordinary shift diagram set using the accelerator pedal stroke and the vehicle speed. The sporty gear position and the normal gear position are compared (coordinated) by a gear position coordinating means B43, and the lower-speed gear position (the gear position having the larger speed ratio) is selected, namely, "minimum selection" is made. A final gear position specifying means B44 generates the thus selected gear position as a control signal. Namely, the transmission 13 functions as an engine speed control mechanism for controlling the rotational speed of the engine as a driving power source. Accordingly, when the requested amount of driving force represented by the accelerator pedal stroke is small, and therefore, the normal gear position is a higher-speed gear position than the sporty gear position, the sporty gear position is maintained, and the lower-vehicle-speed gear position (having the larger speed ratio) is established.

For the transmission having two or more gear positions, the above-described control is shift control that aims to establish a lower-vehicle-speed gear position (speed ratio having a larger value). As the speed ratio increases under the control, the driving force or engine brake force becomes large, and the vehicle behaves with crispness, thus providing a characteristic that offers a sporty ride, or a characteristic that meets with the driving orientation of the driver or a running environment, such as a condition of the road on which the vehicle is running. In the vehicle on which the transmission having two or more gear positions is installed, the above control may be executed when a sporty mode is selected with a mode selection switch installed on the vehicle, and the control may be prohibited when, for example, the sporty mode is not selected.

The above-mentioned electronic control unit 28 may have the functions of the respective means shown in FIG. 11, or the functions of the respective means shown in FIG. 12. Alternatively, an electronic control unit for sporty-mode control may be provided, and the electronic control unit for sporty-mode control may have the above-indicated functions.

Figure 13:
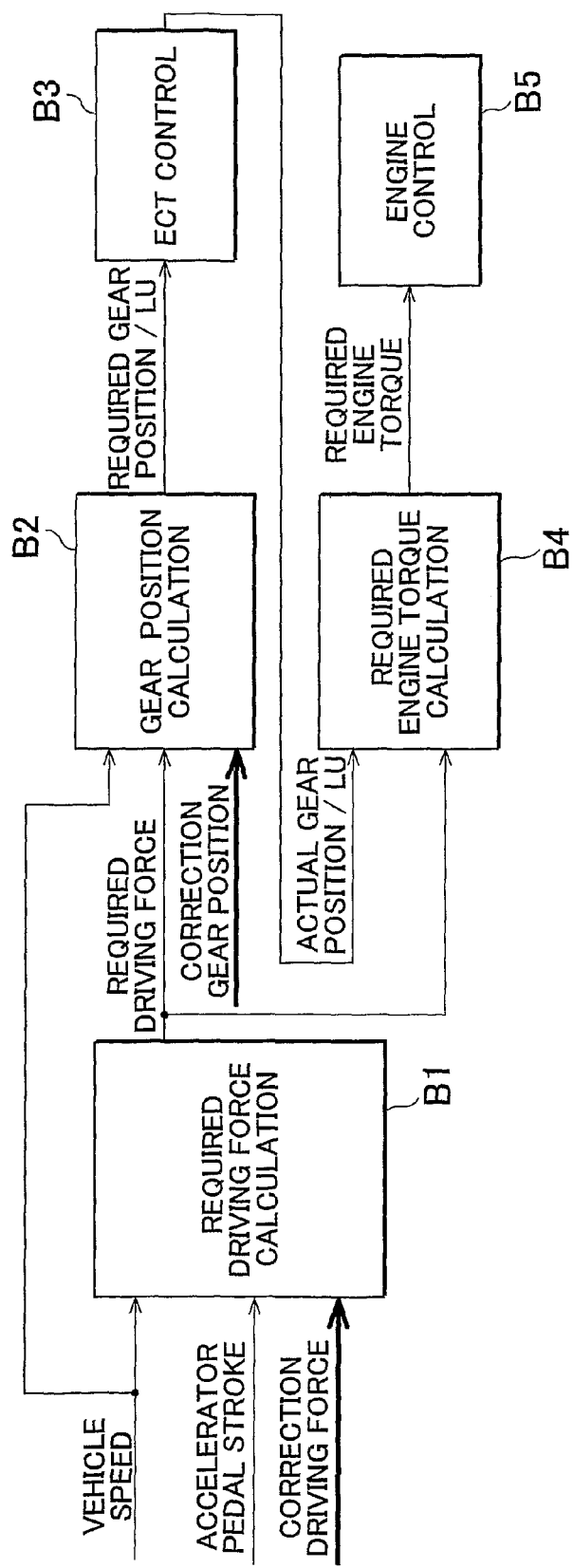
FIG. 13 is a block diagram of control for causing shift control and engine output control to reflect a correction gear position and correction driving force obtained based on the command SPI, in a vehicle in which an automatic transmission having two or more gear positions is installed, according to one embodiment of the invention.

Next, control for correcting the gear position and the driving force and resulting changes in the running characteristics when the vehicle control system of the invention is applied to the vehicle on which the internal combustion engine is installed as the driving power source and the transmission having two or more gear positions is installed will be described. FIG. 13 shows an example in which a target gear position and a target engine torque are obtained from the required driving force. Initially, the required driving force is calculated from the vehicle speed and the accelerator pedal stroke (block B1). Since the required driving force is determined by, for example, the weight of the vehicle body and the power performance given to the vehicle, a map that defines the required driving force in relation to the vehicle speed and the accelerator pedal stroke is prepared in advance, and the calculation in block B1 is performed by determining the required driving force based on the map. On one hand, the gear position (or the speed of the transmission) is calculated based on the required driving force (block B2). The shift control of the transmission having two or more gear positions is performed based on a shift diagram in which regions of respective gear positions, or upshifting lines and downshifting lines, are set using the vehicle speed and required driving force as parameters. Thus, the gear position is calculated in block B2 based on the shift diagram prepared in advance. The required gear position thus obtained is generated as a control command signal to a shift control device (ECT) B3 where shift control of the transmission 13 is carried out. If a lock-up clutch (LU) is provided in the power transmission path of the vehicle 1, engagement/release of the lock-up clutch is determined based on a map prepared in advance, and a command signal for controlling the engagement/release of the lock-up clutch is also generated.

On the other hand, the required engine torque is calculated based on the required driving force obtained in the above-indicated block B1 and the actual gear position of the transmission 13 (block B4). Since the engine speed is determined based on the gear position and the vehicle speed, the required engine torque can be calculated based on the engine speed and the required driving force. Then, the engine 8 is controlled so as to produce the thus obtained engine torque (block B5). More specifically, the throttle opening is controlled.

In the vehicle control system according to the invention, the command SPI is changed based on the instantaneous SPI such as the longitudinal acceleration Gx, the lateral acceleration Gy, or the composite acceleration into which these accelerations Gx, Gy are combined, and the required maximum acceleration is changed in accordance with the change of the command SPI. The required maximum acceleration is reflected by the shift control as explained above with reference to FIG. 12. If the gear position determined based on the command SPI in the sporty mode is a lower-vehicle-speed gear position than the gear position in the normal mode, the lower-vehicle-speed gear position is set as the finally specified gear position. The basic arrangement explained above with reference to FIG. 13 is adapted to perform shift control in the normal mode; therefore, if the finally specified gear position based on the command SPI is the lower-vehicle-speed gear position, this gear position is received by block B2, and is set as the required gear position. As a result, a relatively large speed ratio is obtained. Therefore, the maximum driving force or engine brake force becomes large, and the behavior of the vehicle is controlled with high responsiveness, thus providing a characteristic that offers a sporty ride, or a characteristic that meets with the driving preference of the driver or a running environment, such as a condition of the road on which the vehicle is running.

To provide an acceleration characteristic commensurate with the command SPI, the power generated by the engine 8 may be increased or reduced. For control of the power, block B1 as described above receives correction driving force, and increases or reduces the required driving force obtained by the above-described basic arrangement, using the correction driving force. The control system may be configured to obtain the correction driving force, based on the command SPI as described above. For example, the relationship between the command SPI and the correction driving force may be determined by, for example, experiment or simulation, and the relationship may be prepared in advance as data in the form of a map, for example. Then, the correction driving force may be obtained from data, such as the command SPI obtained during running, and the correction driving force map.

Figure 14:
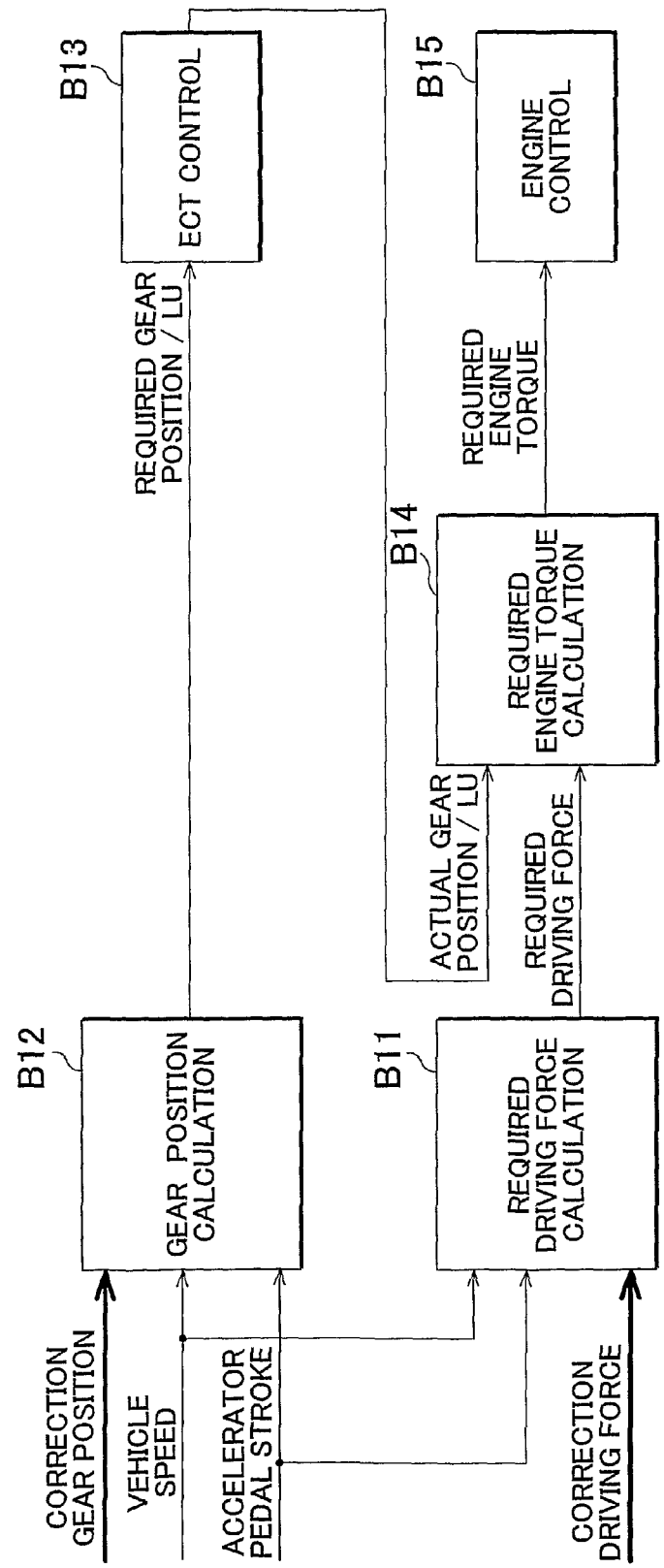
FIG. 14 is a block diagram of another control for causing shift control and engine output control to reflect the correction gear position and correction driving force obtained based on the command SPI, in a vehicle on which an automatic transmission having two or more gear positions is installed, according to one embodiment of the invention.

FIG. 14 shows an example in which the gear position and the required driving force are obtained in parallel with each other, from the vehicle speed and the accelerator pedal stroke. As described above, the speed ratio of the transmission having two or more gear positions is controlled based on the shift diagram in which the gear positions, or the upshifting lines and downshifting lines, are set based on the vehicle speed and the accelerator pedal stroke; therefore, on one hand, the gear position is calculated (in block B12) from the vehicle speed and the accelerator pedal stroke, and, on the other hand, the required driving force is calculated (in block B11) from the vehicle speed and the accelerator pedal stroke. The calculation of the required driving force is similar to the calculation in block B1 shown in FIG. 13 as described above.

The required gear position obtained in block B12 is transmitted to a shift control device (ECT) B13 where shift control is performed on the transmission 13. If a lock-up clutch (LU) is provided in the power transmission path of the vehicle 1, engagement/release of the lock-up clutch is determined based on a map that is prepared in advance, and a command signal for controlling the engagement/release of the lock-up clutch is generated as well.

On the other hand, the required engine torque is calculated (in block B14) based on the required driving force obtained in the above-indicated block B11 and the actual gear position of the transmission 13, and the engine 8 is controlled so as to produce the thus obtained engine torque (block B15). The control in block B14 is similar to the control in block B4 shown in FIG. 13 as described above, and the control in block B15 is similar to the control in block B5 shown in FIG. 13 as described above.

In the arrangement as shown in FIG. 14, too, if the finally specified gear position based on the command SPI is the lower-vehicle-speed gear position, this gear position is received by block B12, and is set as the required gear position. As a result, a relatively large speed ratio is set, resulting in an increase in the acceleration performance as a running characteristic of the vehicle. Also, block B11 receives correction driving force corresponding to the command SPI, and increases or reduces the required driving force determined by the basic arrangement as described above, using the correction driving force.

Figure 15:
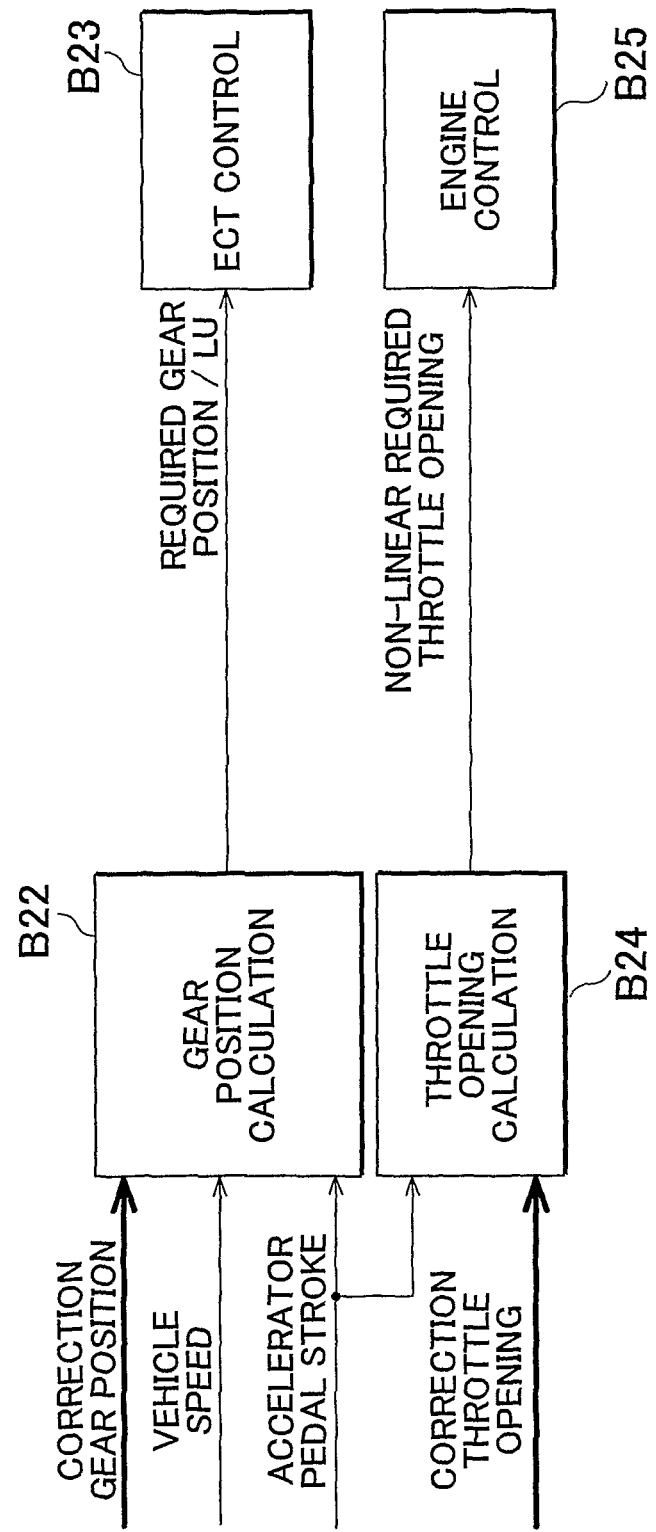
FIG. 15 is a block diagram of further control for causing shift control and engine output control to reflect the correction gear position and correction driving force obtained based on the command SPI, in a vehicle on which an automatic transmission having two or more gear positions is installed, according to one embodiment of the invention.

FIG. 15 shows an example in which the transmission 13 and the engine 8 are controlled independently of each other, based on the vehicle speed and the accelerator pedal stroke. Namely, the gear position is calculated (in block B22) based on the vehicle speed and the accelerator pedal stroke, and the required gear position obtained by the calculation is transmitted to a shift control device (ECT) B23 where shift control is performed on the transmission 13. These controls are similar to those of block B12 and block B13 as shown in FIG. 14. Also, the throttle opening is calculated (in block B24) based on the accelerator pedal stroke, and the engine 8 is controlled (in block B25) according to the required throttle opening. Where the engine 8 has an electronic throttle valve, the relationship between the accelerator pedal stroke and the throttle opening is generally a non-linear relationship. Thus, in a condition where the accelerator pedal stroke is relatively small, the amount of change of the throttle opening is small relative to the amount of change of the accelerator pedal stroke. When the accelerator pedal stroke is relatively large, the relationship between the amount of change of the accelerator pedal stroke and the amount of change of the throttle opening is close to a one-to-one relationship.

With the basic arrangement as shown in FIG. 15, if the finally specified gear position based on the command SPI is the lower-vehicle-speed gear position, this gear position is received by block B22, and is set as the required gear position. As a result, a relatively large speed ratio is set, and the acceleration performance as, a running characteristic of the vehicle is enhanced. Also, block B24 receives a correction throttle opening corresponding to the command SPI, and increases or reduces the required throttle opening obtained by the above-described basic arrangement, using the correction throttle opening. Namely, when the command SPI becomes large, the output characteristic of the driving source relative to the accelerating operation may be changed (for example, the output characteristic may be increased).

In the vehicle control system according to the invention as described above, when the composite the acceleration increases based on the driver's intention of accelerating, decelerating or turning the vehicle, such as when the accelerator pedal 12 is depressed to accelerate the vehicle, or when the brake pedal 7 is depressed to decelerate the vehicle, or when the steering wheel 16 is rotated to turn the vehicle, the command SPI immediately increases in response to the increase of the composite acceleration. As a result, the acceleration performance improves in accordance with the increase of the command SPI, thus enabling the vehicle to generate the required acceleration instantaneously and offer a sporty ride as a running characteristic. Since the above-described operations by the driver are generally performed so as to run the vehicle according to the running environment, such as the gradient of the road on which the vehicle is running, the above-described change in the running characteristic reflects the driving orientation (driver's preferences) and the running environment.

For example, when the vehicle starts running uphill, the vehicle moves in a direction opposite to a direction in which the acceleration of gravity is applied to the vehicle; therefore, the acceleration sensor generates an output value larger than a value corresponding to the actual acceleration. Therefore, when the vehicle accelerates on an uphill, the instantaneous SPI becomes larger than that when the vehicle accelerates on a flat road having no gradient or inclination. Since the command SPI increases as the instantaneous SPI increases, the acceleration characteristic is changed in a direction in which the acceleration force increases. On the uphill, therefore, relatively large driving force can be obtained. To the contrary, on a downhill, the acceleration sensor generates an output value smaller than a value corresponding to the actual acceleration. Therefore, when the vehicle decelerates on a downhill, the instantaneous SPI becomes relatively small. However, if a braking operation is performed so as to suppress or prevent increase of the vehicle speed on the downhill, the acceleration of gravity is added to the acceleration resulting from the braking operation, and the output value of the acceleration sensor becomes relatively large. As a result, the instantaneous SPI increases, and relatively large engine brake force can be obtained. Accordingly, it becomes unnecessary or less necessary to perform special accelerating/decelerating operations for uphill running and downhill running, thus assuring improved driveability. Also, generally known uphill/downhill control, such as inhibition or restriction of establishment of a high-vehicle-speed speed ratio, can be reduced or made unnecessary.

Also, in the above-described vehicle control system of the invention, when a running characteristic of the vehicle is changed based on the accelerations in two or more directions, the degree of change of the running characteristic based on the acceleration of a certain direction (in other words, how the acceleration is reflected by the running characteristic) is made different from that based on the acceleration of another direction, in view of the case where the degree of appearance of an acceleration or the magnitude of the acceleration, or the driving sense or feel possessed by the driver or an influence of the acceleration on the behavior, differs depending on the direction of the acceleration. Thus, the running characteristic can be more appropriately changed based on the accelerations in two or more directions.

In the above-described embodiment, an acceleration in any of the longitudinal and lateral directions appears once the vehicle starts running, and the command SPI increases according to the acceleration. On the other hand, reduction of the command SPI is relatively delayed. Therefore, the command SPI and the required maximum acceleration rate increase with the elapsed time or distance travelled after start of running, resulting in an increase in the sportiness in running.

It is to be noted that factors that influence the running characteristics of the vehicle or determine the running characteristics are not limited to the acceleration characteristic or performance achieved by controlling the speed ratio, but also include an output characteristic of engine torque relative to an accelerating operation, steering characteristic as a relationship between the steering angle or steering force and the turn angle of the front wheels, vibration damping characteristic of the suspension system 4, and a turning characteristic based on the ratio of distribution of torque to the front wheels and rear wheels of a four-wheel drive vehicle. The vehicle control system of the invention is operable to change these characteristics, based on the index obtained from the acceleration. For example, in accordance with the above-described command SPI, the output response of the driving source such as the engine 8 is made appropriate, namely, the rate of increase of the throttle opening is made appropriate, the assist torque provided by the assist mechanism 18 is made appropriate, thus making the driver feel appropriately directly about steering, the gear ratio of the steering mechanism 15 is made appropriate, and the turning ability is made appropriate by increasing the amount of torque distributed to the rear wheels appropriate. The control for changing each characteristic can be implemented by changing the output characteristics of the actuators provided in the respective mechanisms.

Figure 16:
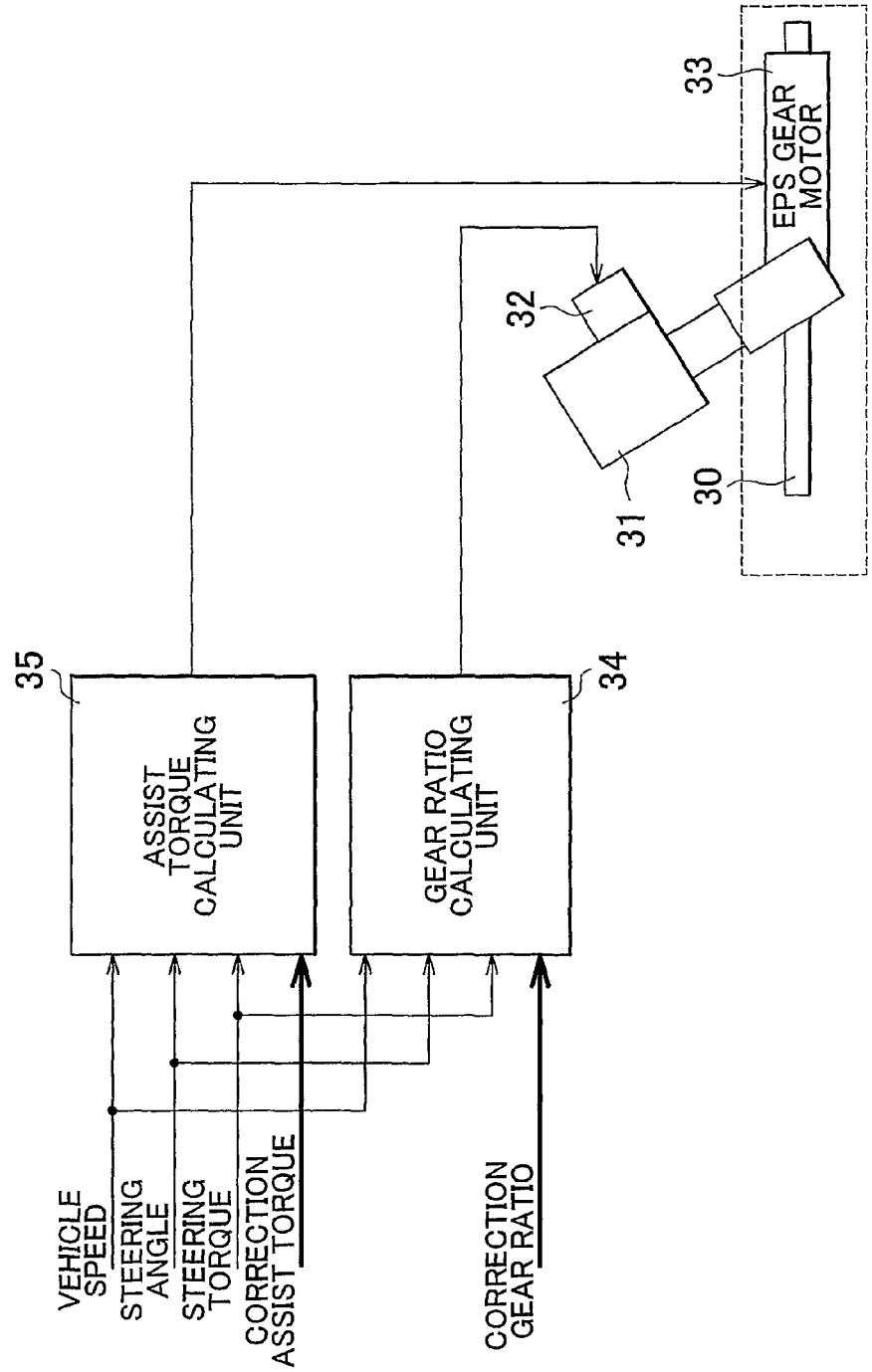
FIG. 16 is a block diagram of control for causing a steering characteristic to reflect a correction gear ratio and correction assist torque obtained based on the command SPI according to one embodiment of the invention.

The vehicle control system of the invention may be used in the case where the steering characteristic or suspension characteristic as one of the running characteristics of the vehicle is changed, as well as the case where the acceleration characteristic or power characteristic of the vehicle is changed. FIG. 16 is a block diagram useful for explaining control for changing the steering characteristic based on the above-described command SPI. FIG. 16 schematically shows an electric power steering (EPS) mechanism using a variable gear ratio steering gear (VGRS gear). A rack 30 that moves back and forth in the width direction (lateral direction) of the vehicle in response to the steering force is provided, and a gear of a VGRS gear unit 31 is in mesh with the rack 30. A VGRS actuator 32 for changing the gear ratio is mounted on the VGRS gear unit 31. Also, an EPS gear motor 33 is provided for assisting in movement of the rack 30 in the direction in which the steering force is applied. The EPS mechanism further includes a gear ratio calculating unit 34 that generates a command signal to the VGRS actuator 32 so as to change the gear ratio, and an assist torque calculating unit 35 that calculates torque (thrust applied to the rack 30) to be produced by the EPS gear motor, and generates a command signal representing the torque. As the electric power steering mechanism and respective calculating units, those having generally known arrangements or configurations may be used.

Each of the calculating units 34, 35 receives detection values of the vehicle speed, steering angle and steering torque as data. These items of data can be obtained by sensors provided respectively. In addition, the gear ratio calculating unit 34 receives data indicative of a correction gear ratio. The correction gear ratio is a gear ratio used for correcting the command signal to the VGRS actuator 32, and is set to a value corresponding to the command SPI. More specifically, a map that defines the relationship between the correction gear ratio and the command SPI may be prepared in advance, and the correction gear ratio may be determined according to the map. The relationship between the command SPI and the correction gear ratio may be suitably determined as needed.

On the other hand, the assist torque calculating unit 35 receives correction assist torque as data, in addition to the vehicle speed, steering angle and steering torque as described above. The correction assist torque is torque for correcting the command signal to the EPS gear motor 33, and is set to a value corresponding to the command SPI. More specifically, a map that defines the relationship between the command SPI and the correction assist torque may be prepared in advance, and the assist torque may be determined according to the map. The relationship between the command SPI and the correction assist torque may be appropriately determined as needed.

Accordingly, with the arrangement as shown in FIG. 16, the gear ratio of the VGRS unit 31 is changed, or the assist torque added to the steering force is changed, according to the magnitude of the command SPI obtained based on the acceleration applied to the vehicle.

Figure 17:
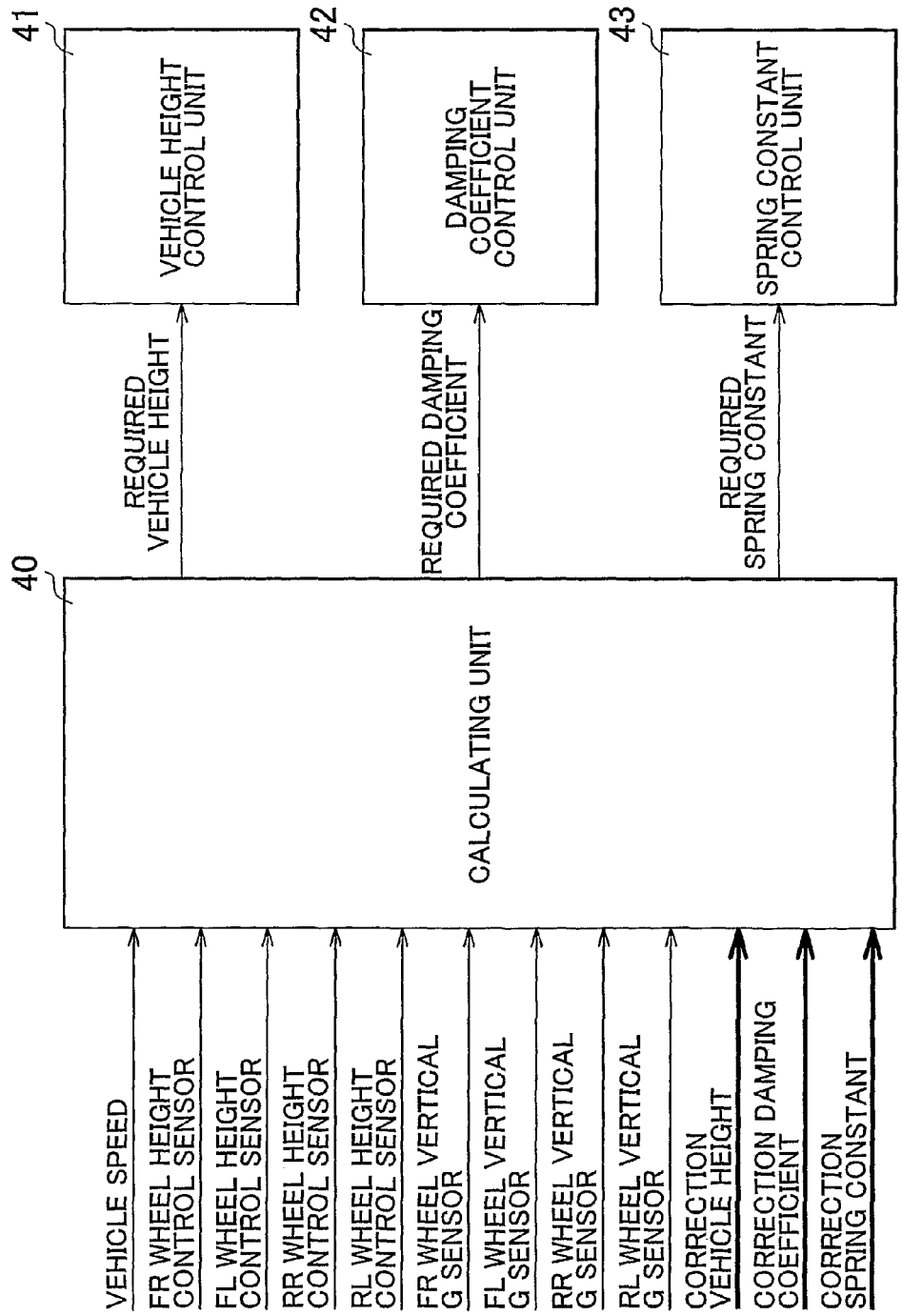
FIG. 17 is a block diagram of control for causing a suspension characteristic to reflect a vehicle height, a correction damping coefficient and a correction spring constant obtained based on the command SPI according to one embodiment of the invention.

FIG. 17 is a block diagram useful for explaining control for changing suspension characteristics, based on the above-described command SPI. FIG. 11 shows an example in which the vehicle control system is configured to control the vehicle height, vibration damping coefficient and spring constant associated with a suspension mechanism (not shown). A calculating unit 40 is provided for calculating required values of the vehicle height, vibration damping coefficient and spring constant. The calculating unit 40 consists principally of a microcomputer, as one example, and performs calculations using input data and data stored in advance, so as to obtain the required vehicle height, required damping coefficient, and the required spring constant. Examples of the data include the vehicle speed, detection signal of a front, right (FR) wheel height control sensor, detection signal of a front, left (FL) wheel height control sensor, detection signal of a rear, right (RR) wheel height control sensor, detection signal of a right, left (RL) wheel height control sensor, detection signal of a front, right (FR) wheel vertical G (acceleration) sensor, detection signal of a front, left (FL) wheel vertical G (acceleration) sensor, detection signal of a rear, right (RR) wheel vertical G (acceleration) sensor, and a detection signal of a rear, left (RL) wheel vertical G (acceleration) sensor, as data. These devices are similar to those generally known in the art.

In the example as shown in FIG. 17, the calculating unit 40 receives a correction vehicle height, a correction damping coefficient and a correction spring constant, as data for controlling the suspension characteristics. The correction vehicle height is data for correcting the vehicle height according to the command SPI. For example, a map that defines the relationship between the correction vehicle height and the command SPI may be prepared in advance, and the correction vehicle height may be determined according to the map. When the command SPI has a large value, it is considered that crisp running is preferred as a running characteristic of the vehicle; therefore, the correction vehicle height is set to a smaller value or a negative value as the command SPI increases, so that the required vehicle height is reduced (lowered). Also, the correction damping coefficient is data for correcting the damping coefficient of a device, such as a shock absorber, which performs a vibration damping function. For example, a map that defines the relationship between the correction damping coefficient and the command SPI is prepared in advance, and the correction damping coefficient is determined according to the map. When the command SPI has a large value, the characteristic is set taking into account that crisp running is preferred as a running characteristic of the vehicle. Similarly, the correction spring constant is data for correcting the spring constant of the suspension system. For example, a map that defines the relationship between the correction spring constant and the command SPI may be prepared in advance, and the correction spring constant may be determined according to the map. When the command SPI has a large value, the characteristic is set taking into account that a characteristic that permits crisp running of the vehicle is desirable as a running characteristic of the vehicle.

The above-indicated calculating unit 40 is configured to perform calculations using the data as described above, and generate the required vehicle height thus calculated, as a control command signal, to a vehicle height control unit 41, so as to control the vehicle height according to the command SPI. More specifically, when the command SPI is relatively large, the vehicle height is controlled to be relatively small. Also, the calculating unit 40 is configured to generate the required damping coefficient obtained as a result of calculation, as a control command signal, to a damping coefficient control unit 42, and control the damping coefficient according to the command SPI. More specifically, when the command SPI is relatively large, the damping coefficient is controlled to be relatively large. Furthermore, the calculating unit 40 is configured to generate the required spring constant obtained as a result of calculation, as a control command signal, to a spring constant control unit 43, and control the spring constant according to the command SPI. More specifically, when the command SPI is relatively large, the spring constant is controlled to be relatively large.

As described above, the vehicle control system according to the present invention is able to change the suspension characteristics as one example of the running characteristics, according to a control index, such as the command SPI obtained based on the acceleration (particularly the longitudinal acceleration Gx and the lateral acceleration Gy), and set the suspension characteristics suitable for running conditions of the vehicle. As a result, in the case of smooth running with a relatively small longitudinal and/or lateral acceleration(s), the suspension characteristics provide a soft feel or soft ride, thus improving ride comfort. When crisp running of the vehicle is required in which the longitudinal and/or lateral acceleration(s) is/are large, the suspension characteristics provide a hard feel or hard ride, thus assuring improved driveability.

In the controls that have been described with reference to FIGS. 13 to 17 as well, the command SPI that reflects the accelerations generated based on the operation performed by the driver is controlled in the manner that has been described with reference to FIG. 5. Accordingly, if the parameter relating to the lateral acceleration Gy, such as the yaw rate or the steering angle, is equal to or larger than a predetermined value, and therefore, it is determined that the vehicle is in the turning condition, the value $I_{out}$ of the command SPI is held at the previous value. Namely, even if the lateral acceleration Gy changes due to turning, the change is not reflected by the command SPI, that is, the command SPI is not changed.

Therefore, for example, the running characteristics, the engine speed, and the like are not greatly changed during turning, and thus, the vehicle stably runs or turns. In most cases, the lateral acceleration Gy is changed to cause the vehicle to run on an uneven road or on a curved road. Therefore, the lateral acceleration Gy does not necessarily represent the driver's preference. Thus, the driver does not feel uncomfortable due to the command SPI being held at the previous value. Rather, because the command SPI is held at the previous value, the vehicle runs in the manner expected by the driver.

If the acceleration Gx that increases the vehicle speed is larger than the lateral acceleration Gy at that time, and therefore, it is determined that the vehicle is in the non-turning condition, the command SPI is increased by the increase of the instantaneous SPI caused by the increase of the acceleration(s). If a predetermined condition is satisfied, for example, a condition that the acceleration(s) continue(s) to be relatively small is satisfied, the command SPI is reduced. Namely, the sportiness is changed in accordance with the change of the acceleration(s), and thus, the running characteristics matching the running orientation of the driver are set. Particularly, when the deceleration is large, the running orientation of the driver represented by the braking operation is more likely to be reflected by the command SPI, and thus, it is possible to change the running characteristics with high responsiveness.

In the invention, the predetermined purpose, such as the purpose of increasing the likelihood of making the determination, may be achieved by performing numerical processing on, for example, detected data or data compared with the detected data, in addition to executing the controls in the above-described specific examples.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A vehicle control system for use with a vehicle, the vehicle control system comprising:
   an electronic control unit storing an index configured to set a running characteristic of the vehicle that is determined based on a running condition of the vehicle;
   the index being configured to execute a change of the index that makes behavior of the vehicle crisper more than a change of the index that makes the behavior of the vehicle milder; and
   when it is determined that the vehicle is in a turning condition, a change in the index or the running characteristic is suppressed.

2. The vehicle control system according to claim 1, wherein
   when it is determined that the vehicle is in the turning condition, the index or the running characteristic based on the index is kept.

3. The vehicle control system according to claim 1, wherein
   the index is set to a large value when the running characteristic for making the behavior of the vehicle crisp is provided, and the index is set to a small value when the running characteristic for making the behavior of the vehicle mild is provided;
   if a current value of the index obtained based on the current running condition of the vehicle is larger than a held value of the index that has already been set and has been held, the index is updated to the current value; and
   if the current value of the index is equal to or smaller than the held value of the index, an integral value of a deviation between the current value and the held value is calculated, and when the integral value exceeds a predetermined threshold value, the value of the index is reduced.

4. The vehicle control system according to claim 1, wherein
   the index is set to a large value when the running characteristic for making the behavior of the vehicle crisp is provided, and the index is set to a small value when the running characteristic for making the behavior of the vehicle mild is provided; and
   when the value of the index that has already been set is large, a determination that the vehicle is in the turning condition is more likely to be made than when the value of the index that has already been set is small.

5. The vehicle control system according to claim 1, wherein
   the index is set to a large value when the running characteristic for making the behavior of the vehicle crisp is provided, and the index is set to a small value when the running characteristic for making the behavior of the vehicle mild is provided; and
   when the value of the index that has already been set is large, a longitudinal acceleration of the vehicle is less likely to be reflected by a change of the index or a change of the running characteristic than when the value of the index that has already been set is small.

6. The vehicle control system according to claim 1, wherein
   it is determined whether the vehicle is in the turning condition, by comparing a longitudinal acceleration of the vehicle with a lateral acceleration of the vehicle.

7. The vehicle control system according to claim 1 wherein
   the index is set to a large value when the running characteristic for making the behavior of the vehicle crisp is provided, and the index is set to a small value when the running characteristic for making the behavior of the vehicle mild is provided; and
   when the value of the index that has already been set is small, the value of the index is more likely to be reduced than when the value of the index that has already been set is large.

8. The vehicle control system according to claim 1, wherein
   the index is set to a large value when the running characteristic for making the behavior of the vehicle crisp is provided, and the index is set to a small value when the running characteristic for making the behavior of the vehicle mild is provided; and
   in a case where the value of the index is reduced, when the value of the index that has already been set is small, the value of the index is reduced at a larger rate than when the value of the index that has already been set is large.

9. The vehicle control system according to claim 1, wherein
   it is determined whether the vehicle is in the turning condition, based on a tire friction circle relating to the vehicle.

10. The vehicle control system according to claim 9, wherein
   it is determined whether the vehicle is in the turning condition, based on the tire friction circle that indicates a composite acceleration into which accelerations in at least two directions are combined, the accelerations in at least two directions including a longitudinal acceleration and a lateral acceleration of the vehicle.

11. The vehicle control system according to claim 1, wherein
it is determined whether the vehicle is in the turning condition, based on at least one of road information relating to a road on which the vehicle is running, a steering angle of the vehicle, a difference between rotational speeds of right and left wheels, and a yaw rate generated in the vehicle.

12. The vehicle control system according to claim 1, wherein the behavior of the vehicle being crispier includes adjusting the suspension of the vehicle to be stiffer, and enhancing the responsiveness of acceleration and steering of the vehicle to a driver's control.

13. A vehicle control system for use with a vehicle, the vehicle control system comprising:
an electronic control unit storing an index configured to set a running characteristic of the vehicle that is determined based on a running condition of the vehicle;
the index being configured to execute a change of the index that makes behavior of the vehicle crisper more than a change of the index that makes the behavior of the vehicle milder; and
when the index is set to a value at which a degree of crispness of the behavior of the vehicle is relatively low, the index is configured to execute a change of the index that reduces the degree of crispness of the behavior of the vehicle more than when the index is set to a value at which the degree of crispness of the behavior of the vehicle is relatively high.

14. The vehicle control system according to claim 13, wherein
the index is set to a large value when the running characteristic for making the behavior of the vehicle crisp is provided, and the index is set to a small value when the running characteristic for making the behavior of the vehicle mild is provided;
if a current value of the index obtained based on the current running condition of the vehicle is smaller than a held value of the index that has already been set and has been held, an integral value of a deviation between the current value and the held value is calculated, and when the integral value exceeds a predetermined threshold value, the value of the index is reduced; and
the threshold value is set to a smaller value as the held value of the index becomes smaller.

15. The vehicle control system according to claim 13, wherein the behavior of the vehicle being crispier includes adjusting the suspension of the vehicle to be stiffer, and enhancing the responsiveness of acceleration and steering of the vehicle to a driver's control.

16. A vehicle control method for use with a vehicle, the method comprising:
setting, with an electronic control unit, an index based on a running characteristic of the vehicle that is determined based on a running condition of the vehicle; and
executing, with the electronic control unit, a change of the index that makes behavior of the vehicle crisper more than a change of the index that makes the behavior of the vehicle milder, wherein
when it is determined that the vehicle is in a turning condition, a change in the index or the running characteristic is suppressed by the electronic control unit.

17. A vehicle control method for use with a vehicle, the vehicle control method comprising:
setting, with an electronic control unit, an index based on a running characteristic of the vehicle that is determined based on a running condition of the vehicle; and
executing, with the electronic control unit, a change of the index that makes behavior of the vehicle crisper more than a change of the index that makes the behavior of the vehicle milder, wherein
when the index is set to a value at which a degree of crispness of the behavior of the vehicle is relatively low, the index executes a change of the index that reduces the degree of crispness of the behavior of the vehicle more than when the index is set to a value at which the degree of crispness of the behavior of the vehicle is relatively high by the electronic control unit.

* * * * *